United States Patent
Azuma et al.

(10) Patent No.: US 8,864,256 B2
(45) Date of Patent: Oct. 21, 2014

(54) IMAGE PROCESSING APPARATUS FOR PROCESSING MULTIVALUE IMAGE DATA IN AN AREA CORRESPONDING TO AN OVERLAPPED PORTION OF NOZZLE ARRAYS

(75) Inventors: Satoshi Azuma, Kawasaki (JP); Yoshiaki Murayama, Tokyo (JP); Kei Kosaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 12/960,425

(22) Filed: Dec. 3, 2010

(65) Prior Publication Data
US 2011/0316910 A1 Dec. 29, 2011

(30) Foreign Application Priority Data
Jun. 24, 2010 (JP) ................. 2010-144213

(51) Int. Cl.
| | |
|---|---|
| B41J 29/38 | (2006.01) |
| H04N 1/193 | (2006.01) |
| H04N 1/19 | (2006.01) |
| G06K 15/10 | (2006.01) |
| B41J 29/393 | (2006.01) |
| G06K 15/02 | (2006.01) |
| B41J 2/21 | (2006.01) |
| H04N 1/12 | (2006.01) |

(52) U.S. Cl.
CPC ......... *B41J 29/393* (2013.01); *G06K 2215/111* (2013.01); *B41J 29/38* (2013.01); *H04N 1/1934* (2013.01); *H04N 1/1903* (2013.01); *H04N 1/12* (2013.01); *G06K 15/107* (2013.01); *G06K 15/1898* (2013.01); *B41J 2/2146* (2013.01)
USPC ............................................................. 347/9

(58) Field of Classification Search
None
See application file for complete search history.

(56) References Cited

U.S. PATENT DOCUMENTS

| | | | | |
|---|---|---|---|---|
| 6,511,143 | B1 * | 1/2003 | Ishikawa et al. | 347/9 |
| 7,484,821 | B2 * | 2/2009 | Sudo et al. | 347/13 |
| 2004/0095420 | A1 * | 5/2004 | Ikemoto et al. | 347/40 |
| 2005/0128248 | A1 * | 6/2005 | Wada et al. | 347/49 |
| 2006/0274100 | A1 * | 12/2006 | Uji et al. | 347/15 |
| 2008/0136855 | A1 * | 6/2008 | Ochiai et al. | 347/15 |

FOREIGN PATENT DOCUMENTS

| | | | | |
|---|---|---|---|---|
| EP | 0914950 A2 * | 5/1999 | | B41J 2/155 |
| JP | 05-057965 A | 3/1993 | | |
| JP | 2000-103088 A | 4/2000 | | |
| JP | 2008143065 A | 6/2008 | | |

* cited by examiner

*Primary Examiner* — Geoffrey Mruk
*Assistant Examiner* — Bradley Thies
(74) *Attorney, Agent, or Firm* — Canon U.S.A., Inc. IP Division

(57) ABSTRACT

When distributing image data of a plurality of planes to a first chip and a second chip that constitute the same overlapped portion of a connected head, a distribution method is changed for at least a part of the plurality of planes.

14 Claims, 30 Drawing Sheets

FIG. 7A

MULTIVALUED DATA 101301

| 226 | 179 | 138 | 136 | 4   | 15 |
| --- | --- | --- | --- | --- | --- |
| 239 | 162 | 15  | 85  | 77  | 46 |
| 130 | 146 |     |     |     |    |
| 135 | 103 |     |     |     |    |

FIG. 7B

MULTIVALUED DATA (PLANE 1) 101302

| 113 | 89 | 69 | 68 | 2  | 7  |
| --- | --- | --- | --- | --- | --- |
| 119 | 81 | 7  | 42 | 38 | 23 |
| 65  | 73 |    |    |    |    |
| 67  | 51 |    |    |    |    |

MULTIVALUED DATA (PLANE 2) 101305

| 113 | 89 | 69 | 68 | 2  | 7  |
| --- | --- | --- | --- | --- | --- |
| 119 | 81 | 7  | 42 | 38 | 23 |
| 65  | 73 |    |    |    |    |
| 67  | 51 |    |    |    |    |

FIG. 7C

QUANTIZATION (ERROR DIFFUSION) COEFFICIENT A 101303

|     | *   | 2/8 | 2/8 |
| --- | --- | --- | --- |
| 1/8 | 2/8 | 3/8 |     |

QUANTIZATION (ERROR DIFFUSION) COEFFICIENT B 101306

|      | *    | 7/32 | 3/32 |
| ---- | ---- | ---- | ---- |
| 5/32 | 7/32 | 7/32 |      |
|      | 3/32 |      |      |

FIG. 7D

AFTER QUANTIZATION 101304

| 5 | 1 | 1 | 5 |
| --- | --- | --- | --- |
| 0 | 0 | 1 | 2 | 4 |
| 3 | 1 | 2 | 5 |
| 2 | 4 | 6 | 2 |

AFTER QUANTIZATION 101307

| 4 | 5 | 0 | 4 |
| --- | --- | --- | --- |
| 4 | 6 | 0 | 6 |
| 4 | 1 | 5 | 0 |
| 2 | 6 | 6 | 2 |

FIG. 8A  FIG. 8B  FIG. 8C
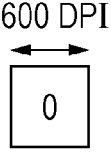
CONVEYING DIRECTION

→ NOZZLE ARRANGEMENT DIRECTION
↓ CONVEYING DIRECTION

NOZZLE ARRANGEMENT DIRECTION →

CONVEYING DIRECTION ↓

→ NOZZLE ARRANGEMENT DIRECTION
↓ CONVEYING DIRECTION

NOZZLE ARRANGEMENT DIRECTION →

CONVEYING DIRECTION ↓

NOZZLE ARRANGEMENT DIRECTION →

CONVEYING DIRECTION ↓

NOZZLE ARRANGEMENT DIRECTION

CONVEYING DIRECTION

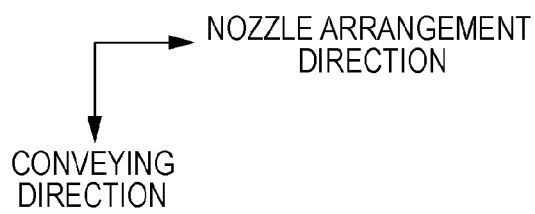
FIG. 25A    FIG. 25B
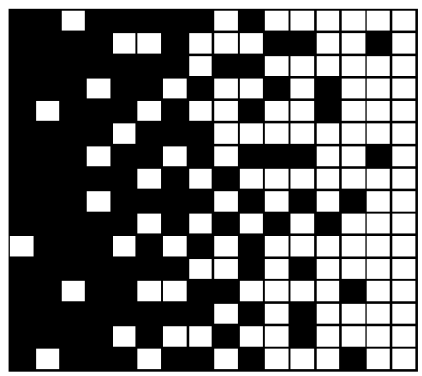 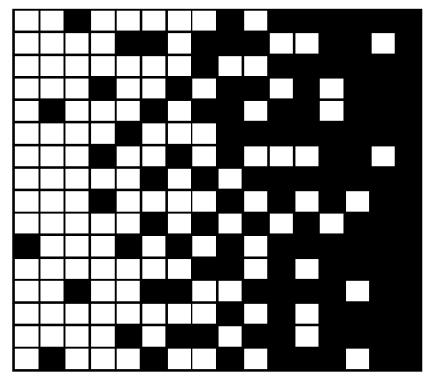
FIG. 25C
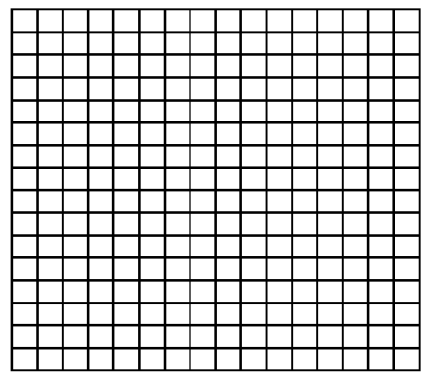

IMAGE PROCESSING APPARATUS FOR PROCESSING MULTIVALUE IMAGE DATA IN AN AREA CORRESPONDING TO AN OVERLAPPED PORTION OF NOZZLE ARRAYS

BACKGROUND OF THE INVENTION

1. Field of the Invention

The present invention relates to an image processing apparatus and an image processing method for processing multivalued image data in an area corresponding to an overlapped portion of nozzle arrays in order to record an image by using a recording head in which a plurality of nozzle arrays are arranged so that the overlapped portion is included in a direction crossing a direction in which the nozzle arrays are arranged.

2. Description of the Related Art

Conventionally, a recording apparatus is known which uses a recording head (a connected head) in which chips including a nozzle array in which a plurality of nozzles are arranged are arranged in a zigzag pattern. It is known that, as a recording apparatus that uses the connected head, there is a recording apparatus using serial method for performing recording by causing a recording head to scan in a direction crossing the arrangement direction of recording elements and conveying a recording sheet (recording medium) in the arrangement direction of the recording elements. It is also known that, as a recording apparatus that uses another recording method, there is a full-line type recording apparatus in which a recording head in which nozzles (discharge ports) are arranged in the entire recording width of the recording sheet is fixed and recording is performed by conveying the recording sheet in a direction crossing the arrangement direction of the recording elements. In particular, the full-line type recording apparatus uses a recording head in which nozzles (discharge ports) are arranged in the entire recording width of the recording sheet and continuously performs recording of an image of a recording width as the recording medium is conveyed, so that the full-line type recording apparatus can perform high-speed recording.

However, the connected head has a problem as described below. In the connected head, there is an overlapped portion where chips are overlapped with each other in a direction crossing the nozzle arrangement direction, and in the overlapped portion, registration between chips (relationship among relative recording positions of dots) may be out of alignment due to various reasons. Thus, density unevenness and granularity unevenness occur in the overlapped portion, and image quality decreases. The reasons why the registration between the chips gets out of alignment include a problem of accuracy of mounting of chips and a problem of accuracy of conveyance of a recording medium.

In Japanese Patent Laid-Open No. 5-57965, as a method for suppressing streaky image defect that occurs in the overlapped portion of the connected head, a method (hereinafter referred to as gradation mask) for complementarily increasing or decreasing recording duty in the overlapped portion of the chips by using a mask is disclosed.

As a technique for compensating the misalignment of the registration, Japanese Patent Laid-Open No. 2000-103088 discloses an image data processing method for increasing "robustness" against misalignment of registration (hereinafter also referred to as registration misalignment) between paths in multi-path recording. Here, the "robustness" means a resistance characteristic against density unevenness or the like caused by various errors. The above patent document focuses attention on a fact that fluctuations in image density caused by fluctuations in various recording conditions result from a fact that pieces of binary image data corresponding to different recording scans are in a complete mutual complementary relationship. The patent document recognizes that, when pieces of image data corresponding to different recording scans are generated so that the complementary relationship is reduced, multi-path recording having a good "robustness" can be realized".

Therefore, in the technique disclosed in Japanese Patent Laid-Open No. 2000-103088, multivalued image data before binarization is divided into a plurality of planes, and these divided multivalued data are individually binarized. In this way, even when pieces of image data corresponding to different recording scans are misaligned with each other and recorded, large density fluctuations do not occur. A supplementary description of "plane" is given here. When original image data is divided corresponding to a plurality of recording scans and/or a plurality of nozzle arrays, the original image data is considered to be an overlap of the plurality of divided image data. Therefore, each divided image data is considered to be one "plane". In the above-described Japanese Patent Laid-Open No. 2000-103088, one recording scan (path) corresponds to one plane.

SUMMARY OF THE INVENTION

According to the invention of Japanese Patent Laid-Open No. 2000-103088, even when registration misalignment occurs between paths, it is possible to prevent large density fluctuations from occurring. However, this patent document does not clearly specify a method for suppressing density fluctuations in an overlapped portion of the connected heads.

In recent years, a connected head in which a plurality of nozzle arrays are arranged in one chip is proposed. However this patent document does not describe a method for suppressing density fluctuations in an overlapped portion in such a connected head.

Therefore, the present invention suppresses density fluctuations caused by registration misalignment in an overlapped portion of a connected head.

An image processing apparatus, which, in order to record an image on a recording medium by a relative movement of the recording medium and a recording head in which a first chip and a second chip which include a plurality of nozzle arrays for ejecting ink are arranged so that an overlapped portion is included in a direction crossing a nozzle array arrangement direction of the nozzle arrays, processes input image data corresponding to the overlapped portion, includes a first distribution unit configured to define a combination of nozzle arrays including at least one nozzle array of the first chip and at least one nozzle array of the second chip as the same plane and distribute multivalued image data corresponding to the overlapped portion to a plurality of planes, and a second distribution unit configured to distribute image data of the plurality of planes to the first chip and the second chip, wherein the second distribution unit changes distribution method for at least a part of the plurality of planes.

An image processing apparatus, which, in order to record an image on a recording medium by a relative movement of the recording medium and a recording head in which a first chip and a second chip which include a plurality of nozzle arrays for ejecting ink are arranged so that an overlapped portion is included in a direction crossing a nozzle array arrangement direction of the nozzle arrays, processes input image data corresponding to the overlapped portion, includes a first distribution unit configured to define a combination of nozzle arrays including at least one nozzle array of the first chip and at least one nozzle array of the second chip as the same plane and distribute multivalued image data corresponding to the overlapped portion to a plurality of planes, and a second distribution unit configured to distribute image data of the plurality of planes to the first chip and the second chip, wherein the second distribution unit distributes image data so that dots occur which are overlapped and recorded in the first chip and the second chip in the overlapped portion.

An image processing method, which, in order to record an image on a recording medium by a relative movement of the recording medium and a recording head in which a first chip and a second chip which include a plurality of nozzle arrays for ejecting ink are arranged so that an overlapped portion is included in a direction crossing a nozzle array arrangement direction of the nozzle arrays, processes input image data corresponding to the overlapped portion, includes a first distribution process configured to define a combination of nozzle arrays including at least one nozzle array of the first chip and at least one nozzle array of the second chip as the same plane and distribute multivalued image data corresponding to the overlapped portion to a plurality of planes, and a second distribution process configured to distribute image data of the plurality of planes to the first chip and the second chip, wherein the second distribution process changes distribution method for at least a part of the plurality of planes.

An image processing method, which, in order to record an image on a recording medium by a relative movement of the recording medium and a recording head in which a first chip and a second chip which include a plurality of nozzle arrays for ejecting ink are arranged so that an overlapped portion is included in a direction crossing a nozzle array arrangement direction of the nozzle arrays, processes input image data corresponding to the overlapped portion, includes a first distribution process configured to define a combination of nozzle arrays including at least one nozzle array of the first chip and at least one nozzle array of the second chip as the same plane and distribute multivalued image data corresponding to the overlapped portion to a plurality of planes, and a second distribution process configured to distribute image data of the plurality of planes to the first chip and the second chip, wherein the second distribution process distributes image data so that dots occur which are overlapped and recorded in the first chip and the second chip in the overlapped portion.

According to the present invention, it is possible to suppress density fluctuations caused by registration misalignment in an overlapped portion of a connected head.

Further features of the present invention will become apparent from the following description of exemplary embodiments with reference to the attached drawings.

BRIEF DESCRIPTION OF THE DRAWINGS

FIG. 7 is a diagram showing a specific example of processing performed until when processing of quantization unit is performed.

FIG. 8 is a diagram for explaining processing used in an index expansion unit.

FIG. 25 is a diagram in which portions where two dots are overlapped are extracted from recording data for each chip in FIG. 24 and displayed.

DESCRIPTION OF THE EMBODIMENTS

Although an embodiment described below uses an inkjet recording apparatus as an example, the present invention is not limited to an inkjet recording apparatus. The present invention can also be applied to apparatuses other than an inkjet recording apparatus if the apparatuses record image on a recording medium by a recording unit while a recording head that records dots is relatively scanning the recording medium.

First Embodiment

Figure 1:
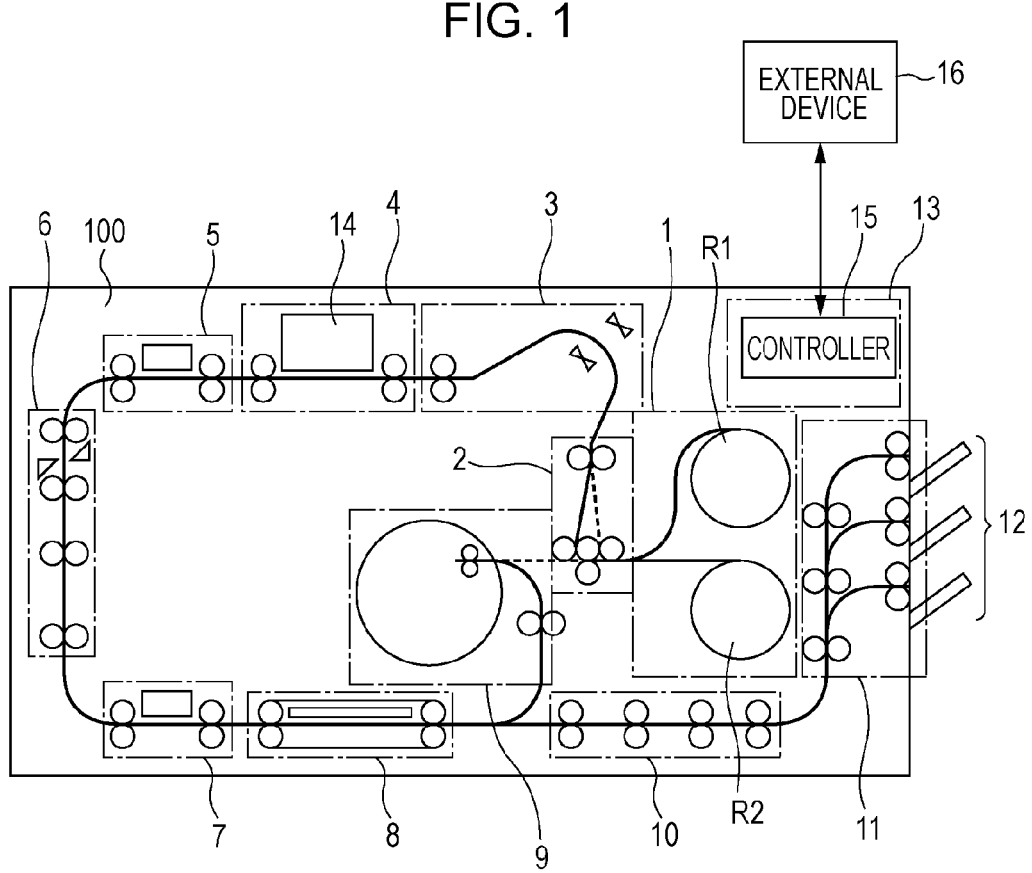
FIG. 1 is a schematic diagram of an inkjet recording apparatus to which the present invention can be applied.

FIG. 1 is a schematic diagram of an inkjet recording apparatus (hereinafter, also simply referred to as a recording apparatus or a printer) to which the present invention can be applied. A printer 100 shown in FIG. 1 is an inkjet recording apparatus for relatively moving a recording head that ejects ink with respect to a recording medium and performing recording. The printer 100 includes a sheet supply unit 1, a de-curl unit 2, a skew correction unit 3, a printing unit 4, an inspection unit 5, a cutter unit 6, an information recording unit 7, a drying unit 8, a sheet winding unit 9, a discharge conveying unit 10, a sorter 11, a discharge tray 12, and a control unit 13. The recording medium (sheet) is conveyed by a conveying mechanism including a roller pairs and a belt along a sheet conveying path shown by solid lines in FIG. 1 and processed by each unit.

The sheet supply unit 1 is a unit for containing and supplying rolled-up continuous sheets. The sheet supply unit 1 can contain two rolls R1 and R2, and alternatively draws and supplies one of the sheets. The number of rolls that can be contained is not limited to two, but the number may be one or three or more. The de-curl unit 2 is a unit for reducing a curl (warping) of the sheet supplied from the sheet supply unit 1. The de-curl unit 2 reduces the curl of the sheet by bending and rubbing the sheet so as to add a reverse curl to the sheet using two pinch rollers for one driving roller. The skew correction unit 3 is a unit for correcting a skew (inclination with respect to a correct conveying direction) of the sheet passed through the de-curl unit 2. The skew of the sheet is corrected by pressing a reference side edge of the sheet against a guiding member.

The printing unit 4 is a unit for forming an image on the conveyed sheet by a recording head 14. The printing unit 4 includes a plurality of conveying rollers that convey the sheet. The recording head 14 is a full-line type recording head in which nozzles are formed over a range covering a maximum width of the sheet. A plurality of recording heads are arranged in parallel along the conveying direction. In this example, recording heads for seven colors Bk (black), Lc (light cyan), Lm (light magenta), Gy (gray), Y (yellow), M (magenta), and C (cyan) are arranged. As a method for ejecting ink from nozzles, it is possible to employ a method using heater elements, a method using piezoelectric elements, a method using electrostatic elements, a method using MEMS elements, and so on. Inks of each color are respectively supplied from ink tanks to the recording heads via ink tubes.

The inspection unit 5 is a unit for optically reading a test pattern or an image printed on the sheet by the printing unit 4 and inspecting states of the nozzles of the recording heads, a state of conveying the sheet, the position of the image, and so forth. The cutter unit 6 is a unit including a mechanical cutter for cutting the sheet after printing in a predetermined length. The cutter unit 6 includes a plurality of conveying rollers for sending the sheet to the next process. The information recording unit 7 is a unit for recording printing information such as a serial number, date, and the like of the printing on the back surface of the cut sheet. The drying unit 8 is a unit for heating the sheet printed by the printing unit 4 and drying the printed ink in a short time. The drying unit 8 includes a plurality of conveying rollers and a conveying belt for sending the sheet to the next process.

The sheet winding unit 9 is a unit for, when performing duplex printing, temporarily winding up the continuous sheet whose front surface has been printed. The sheet winding unit 9 includes a winding drum rotating to wind up the sheet. The sheet whose front surface has been printed and which is not cut is temporarily wound up by the winding drum. When the sheet has been completely wound up, the winding drum rotates in the opposite direction, the wound-up sheet is supplied to the de-curl unit 2, and sent to the printing unit 4. Since the sheet is upside down, the printing unit 4 can print on the back surface of the sheet. A more specific operation of the duplex printing will be described later.

The discharge conveying unit 10 is a unit for conveying the sheet that is cut by the cutter unit 6 and dried by the drying unit 8 and transferring the sheet to the sorter 11. The sorter 11 is a unit for sorting the printed sheets into groups and discharging the groups to different trays of the discharge tray 12 if necessary. The control unit 13 is a unit for controlling each unit of the entire printer.

Figure 2:
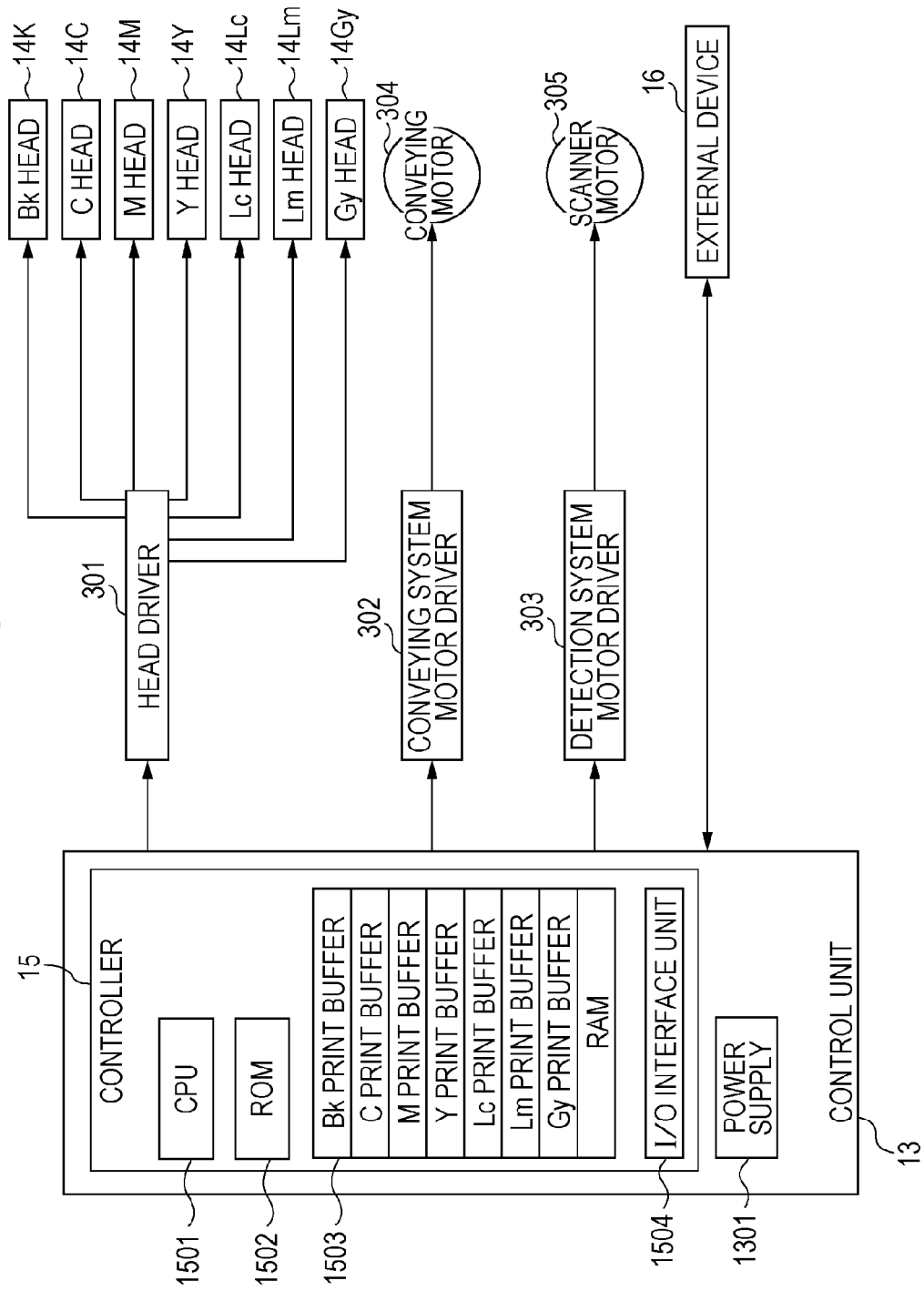
FIG. 2 is a schematic block diagram of a control circuit the inkjet recording apparatus of FIG. 1.

FIG. 2 is a control block diagram of the printer. The control unit 13 has a controller 15 including a CPU 1501, a ROM 1502, a RAM 1503, and various I/O interfaces 1504, and a power supply 1301. The control unit 13 also has an image processing function for executing an image processing flow described below. The operation of the printer is controlled on the basis of an instruction from the controller 15 or an external device 16 such as a host computer connected to the controller 15 via the I/O interfaces 1504.

When receiving a signal from the external device 16, the controller 15 creates recording data to be recorded on a sheet S by using the recording head. The created recording data is stored in the RAM 1503 as a print buffer. Further, the data in the print buffer is transferred to a head driver 301. The head driver 301 converts the data into data for ejecting ink droplets by the recording heads of each color, and an actual recording operation is performed. In this way, the controller 15 has the image processing function for executing the image processing flow described below. The detail of the image processing according to this embodiment will be described later.

The controller 15 performs a conveying operation and a detection operation of the sheet by controlling various motor drivers such as a conveying system motor driver 302 and a detection system motor driver 303 and activating driving sources such as a conveying motor 304 and a scanner motor 305.

Figure 3A:
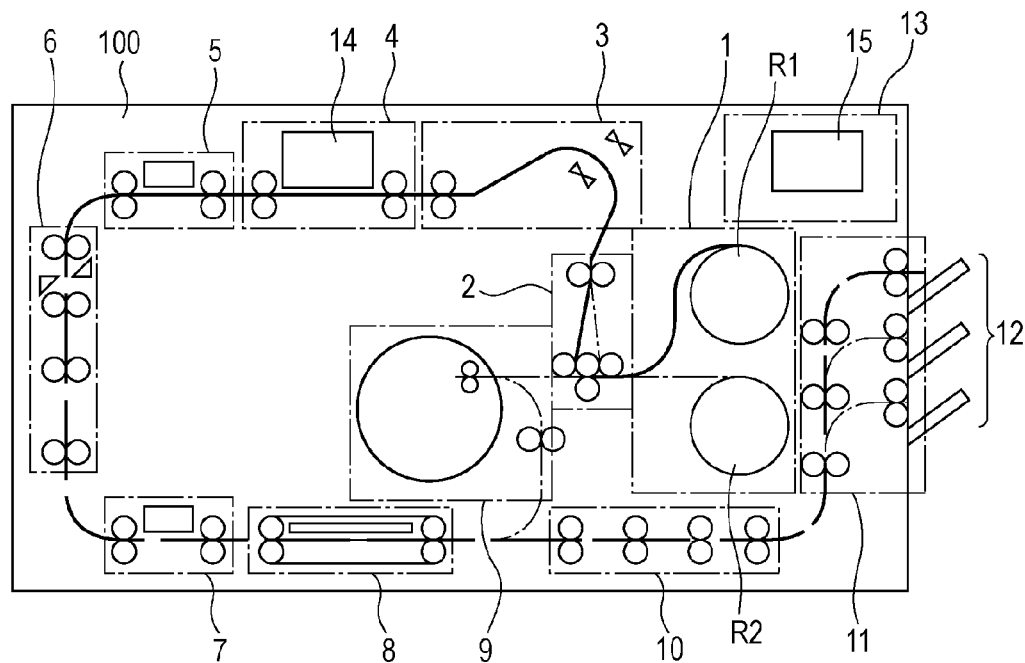
FIG. 3 is a diagram for explaining a printing operation of the inkjet recording apparatus of FIG. 1.

Next, a basic operation of the printing will be described. Since the printing operations of a simplex printing and a duplex printing are different from each other, these operations will be described separately. FIG. 3A is a diagram for explaining a printing operation of the simplex printing. A conveying path through which the sheet supplied from the sheet supply unit 1 is printed and discharged to the discharge tray 12 is indicated by a thick line. The front surface of the sheet, which is supplied from the sheet supply unit 1 and processed by the de-curl unit 2 and the skew correction unit 3 respectively, is printed by the printing unit 4. The printed sheet passes through the inspection unit 5 and is cut into sheets having a predetermined unit length by the cutter unit 6. The printing information is printed on the back surface of the cut sheet by the information recording unit 7 if necessary. Then, the cut sheets are conveyed one by one to the drying unit 8 and dried. Thereafter, the cut sheets are discharged one after another to the tray 12 of the sorter 11 through the discharge conveying unit 10, and stacked on the tray 12.

Figure 3B:
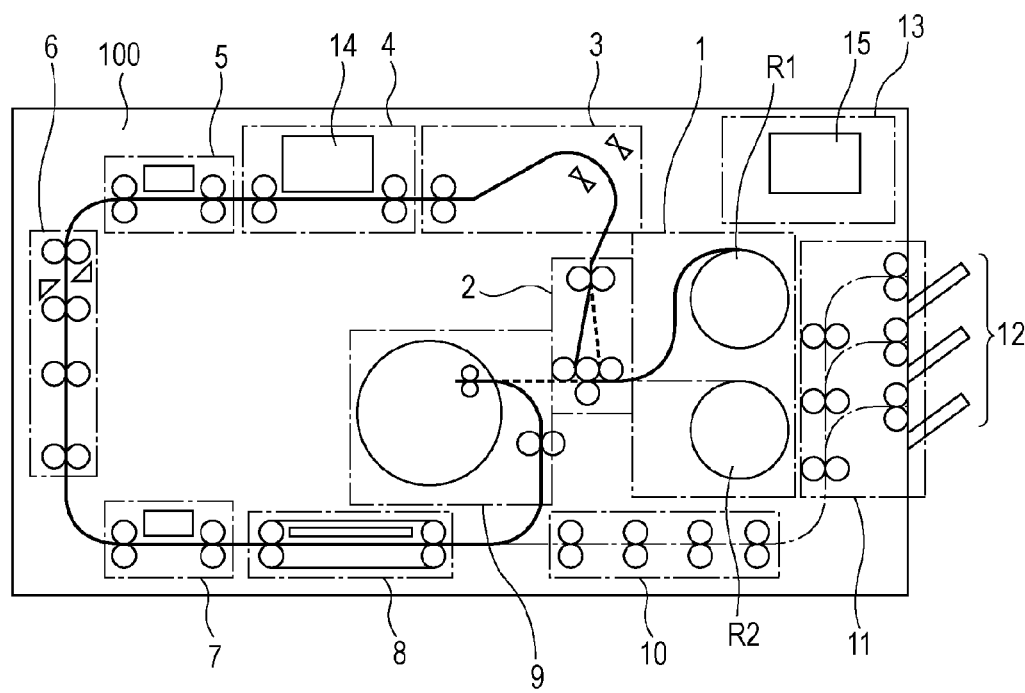

FIG. 3B is a diagram for explaining an operation of the duplex printing. In the duplex printing, a back surface printing sequence is performed after a front surface printing sequence. In the front surface printing sequence, first, the operation of each unit from the sheet supply unit 1 to the inspection unit 5 is the same as that of the above-described simplex printing. In the cutter unit 6, the cutting operation is not performed and the continuous sheet is conveyed to the drying unit 8 without change. After the ink on the surface is dried in the drying unit 8, the sheet is guided into a path to the sheet winding unit 9 instead of the path to the discharge conveying unit 10. The sheet guided into the path is wound up around a wind-up drum of the sheet winding unit 9 rotating in the forward direction (counter-clock-wise direction in FIG. 1). When the planned printing of the front surface is completed in the printing unit 4, the trailing edge of the print area of the continuous sheet is cut in the cutter unit 6. The continuous sheet (on which printing is performed) on the downstream side of the conveying direction from the cut position passes through the drying unit 8 and is wound up by the sheet winding unit 9 until the trailing edge (cut position) of the sheet is reached. On the other hand, the continuous sheet on the upstream side of the conveying direction from the cut position is rewound into the sheet supply unit 1 so that the leading edge (cut position) of the sheet does not remain in the de-curl unit 2. Then, the front surface printing sequence ends.

When the front surface printing sequence ends, the back surface printing sequence starts. In the back surface printing sequence, first, the wind-up drum of the sheet winding unit 9 rotates in the direction (clock-wise direction in FIG. 1) opposite to the direction for winding up the sheet. The edge of the wound-up sheet (the trailing edge of the wound-up sheet becomes the leading edge when the wound-up sheet is sent out) is sent into the de-curl unit 2. In the de-curl unit 2, curl correction in the direction opposite to the previous correction is performed. This is because the sheet wound-up around the wind-up drum is wound upside down with respect to the roll in the sheet supply unit 1, and has a curl in the opposite direction. Thereafter, the continuous sheet passes through the skew correction unit 3, and printing is performed on the back surface of the continuous sheet in the printing unit 4. The printed sheet passes through the inspection unit 5 and is cut into sheets having a predetermined unit length by the cutter unit 6. Since both sides of the cut sheet are printed, recording is not performed in the information recording unit 7. The cut sheets are conveyed one by one to the drying unit 8, and the cut sheets are discharged one after another to the tray 12 of the sorter 11 through the discharge conveying unit 10, and stacked on the tray 12. Then, the back surface printing sequence ends.

Next, a configuration of the printing unit 4 will be described. In the printing unit 4, seven recording heads are arranged corresponding to inks of seven colors. Since the arrangements of the discharge ports (nozzles) of each recording head are the same, in the description below, one recording head will be focused and described.

Figure 4:
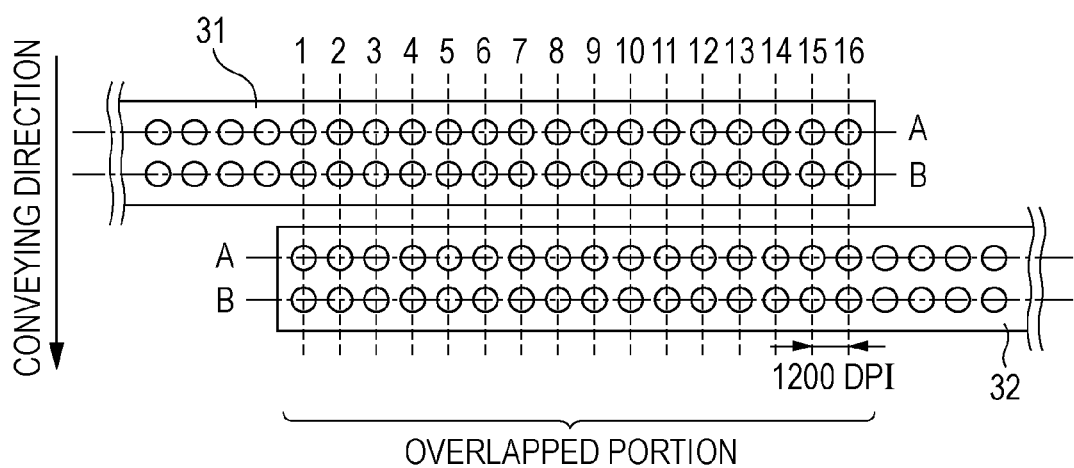
FIG. 4 is a schematic diagram of a printing unit of the inkjet recording apparatus of FIG. 1.

FIG. 4 is a schematic diagram for explaining a nozzle arrangement of the recording head (connected head). In the recording head 14, a plurality of chips including a first chip 31 and a second chip 32 are arranged in a zigzag pattern in a direction of the nozzle arrangement (direction crossing the conveying direction in this example). In the first chip 31 and the second chip 32, two nozzle arrays A and B are disposed along the conveying direction. The interval between the nozzles in each nozzle array is 1200 dpi. A part of the nozzles in the first chip 31 and the second chip 32 are arranged to be overlapped with each other in the conveying direction, and form an overlapped portion. Although the number of the nozzles in the overlapped portion is 16 in this example, the number of the nozzles in the overlapped portion is not limited to this.

Figure 5:
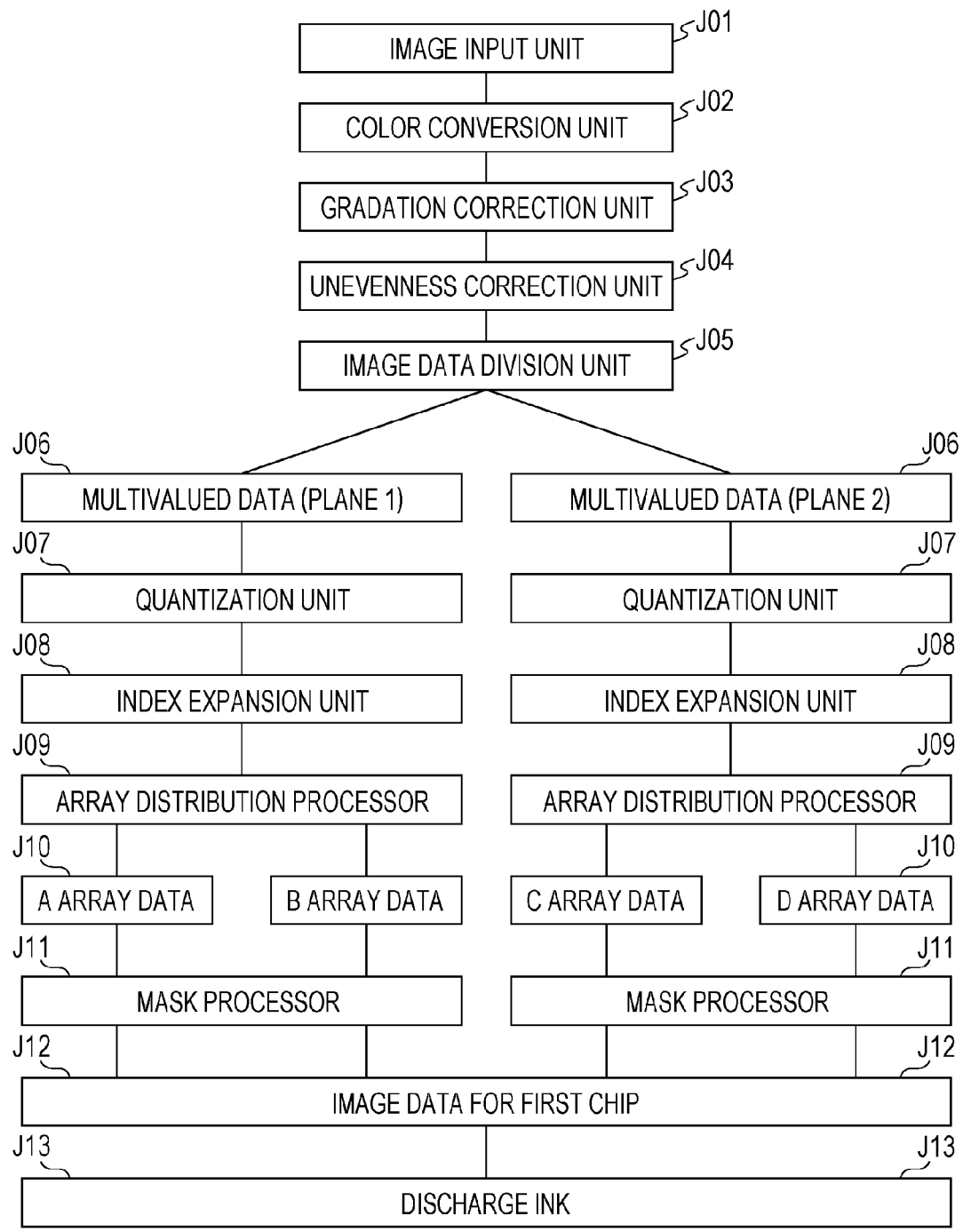
FIG. 5 is a diagram showing a process for processing image data according to a first embodiment.

FIG. 5 shows a process for processing image data, from converting multivalued input image data into head drive data to ejecting ink from nozzles of each chip on the basis of the drive data. FIG. 5A shows an image data processing flow of the first chip, and FIG. 5B shows an image data processing flow of the second chip. A difference between the image data processing flows of FIG. 5A and FIG. 5B is index expansion and mask processing, and the other is the same, so that the image data processing flow of the first chip in FIG. 5A will be described.

First, multivalued image data to be recorded is inputted into an image input unit J01 from an externally connected device such as a host device. In this embodiment, an input resolution of the multivalued image data is 600 dpi×600 dpi, and the multivalued data is brightness data (R, G, B) represented by 8 bits or 256 gray levels per pixel. Next, a color conversion unit J02 converts the multivalued image data inputted into the image input unit J01 into multivalued density data corresponding to ink colors used by the recording apparatus. Here, the multivalued image data is converted into data of 8 bits or 256 gray levels for each color. The following processing is the same for each color.

A gradation correction unit J03 performs gradation correction on the multivalued data that is divided into data for each ink color. An unevenness correction unit J04 corrects unevenness caused by variations of nozzle characteristics by converting values of multivalued ink color data using a lookup table for converting multivalued data of each ink color into multivalued data. An image data division unit J05 corresponds to a first distribution unit and divides the multivalued ink color data into a plane 1 and a plane 2. The image data division unit J05 of this example divides the image data in accordance with a division ratio of "plane 1:plane 2=1:1" regardless of the value (gradation value) of the multivalued ink color data.

The quantization unit J07 performs quantization processing on each plane of multivalued image data J06 divided by the image data division unit J05. Here, 128 gray levels of the data are reduced to 8 gray levels for each plane. An index expansion unit J08 performs binarization processing on the multivalued data whose gray levels are reduced by the quantization unit J07 for each plane while referring to an index expansion table. An array distribution processor J09 distributes 2-gray-level data of 1200 dpi×1200 dpi expanded by using the index expansion table to each nozzle array.

Next, a mask processor J11 performs mask processing on an overlapped portion of the data distributed to each nozzle array. After the above-described series of processing, binary data to be recorded by the array A and the array B of the first chip and the second chip is completed.

Figure 6:
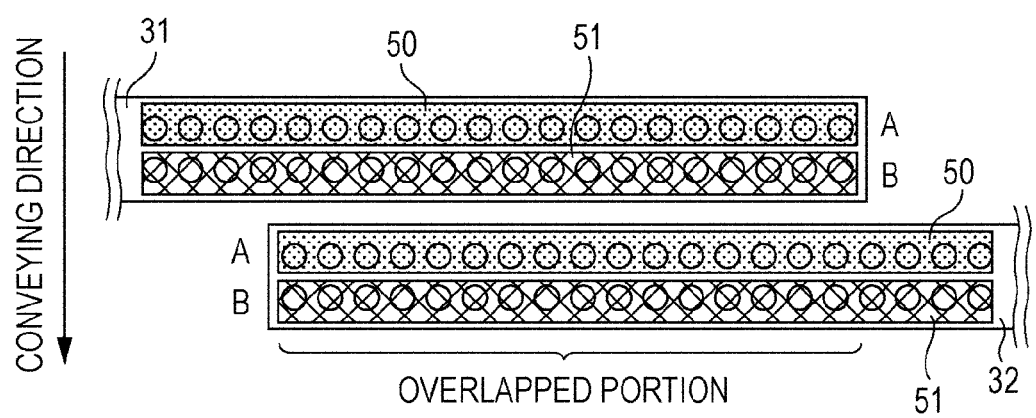
FIG. 6 is a diagram for explaining a method for distributing multivalued image data to each nozzle array.

Next, the image data processing flow of FIG. 5 will be described in detail with reference to FIGS. 6 to 10. FIG. 6 is a diagram for explaining distribution of the multivalued image data divided by the image data division unit J05 to each nozzle array. As shown in FIG. 6, image data 50 for the plane 1 of the multivalued image data J06 is sorted into the array A. On the other hand, image data 51 for the plane 2 is sorted into the array B.

Next, FIG. 7 is a diagram showing a specific example from the processing performed by the image data division unit J05 to the processing performed by the quantization unit J07. FIG. 7 shows an example in which, for example, (a) when multivalued image data (101301) to be recorded including 4 pixels×4 pixels having a resolution of 600 dpi×600 dpi is inputted into the image data division unit J05, the data is divided into two parts. First, (b) the image data division unit J05 divides the multivalued image data (101301) into multivalued image data (101302) for the plane 1 and multivalued image data (101305) for the plane 2. At this time, it is possible to vary the division ratios of the multivalued image data divided into two planes in accordance with gradation values of image data of the pixels. As an example of the above, the image data is divided in accordance with a division ratio of "plane 1:plane 2=2:1" in a low gradation portion, and the image data is divided in accordance with a division ratio of "plane 1:plane 2=1:1" in a high gradation portion.

Next, (c) the quantization unit J07 performs quantization processing (gradation reduction processing) using an error diffusion method on each of the multivalued image data (101302 and 101305) divided by the image data division unit J05. Here, the gradation is reduced to 8 gray levels.

In this way, (d) gradation reduction data (101304) for the plane 1 and gradation reduction data (101307) for the plane 2 are generated. Although the error diffusion method is used as the quantization processing in this example, another method can also be used. However, different quantization methods can be used between the two planes. In particular, in a low gradation portion, the quantization processing can be performed so that, when the two planes are overlapped with each other, positions where dots are overlapped with each other and positions where dots are not overlapped with each other coexist. For example, when the error diffusion method is used as the quantization processing, it is desired that different threshold values and different error distribution coefficients are used between the planes so that the results of the quantization processing between the planes are not the same even when image data of the same gradation values is inputted.

For example, as shown in FIG. 7, the error diffusion is performed using an error distribution coefficient A on the multivalued data (101302) for the plane 1. The error diffusion is performed using an error distribution coefficient B different from the error distribution coefficient A on the multivalued data (101305) for the plane 2. Thereby dot arrangements after the quantization can be different between the planes. In FIG. 7, "*" represents a target pixel.

Return to FIG. 5. The index expansion unit J08 performs binarization processing on the multivalued data whose gray levels are reduced by the quantization unit J07 for each plane while referring to the index expansion table. Here, 8-gray-level data of 600 dpi×600 dpi is converted into 3-gray-level data of 1200 dpi×1200 dpi. FIG. 8 shows an outline of the index expansion table used by the index expansion unit J08. FIG. 8A shows an 8-gray-level signal value of 600 dpi×600 dpi inputted into the index expansion unit J08. FIGS. 8A and 8C are 2-gray-level tables of 1200 dpi×1200 dpi inputted into the index expansion unit J08. FIGS. 8A and 8C are index expansion tables for the plane 1 and the plane 2 respectively. The numbers in the frames are the numbers of dots to be recorded in a unit area of 1200 dpi×1200 dpi. By these index expansion tables, the 8-gray-level image data of 600 dpi×600 dpi inputted into the index expansion unit J08 is converted into 3-gray-level image data of 1200 dpi×1200 dpi. The index expansion tables can be the same between the planes, and also can be different between the planes. The image data after the index expansion is not limited to 3-gray-level, but may be 2-gray-level or the like.

Figure 9A:
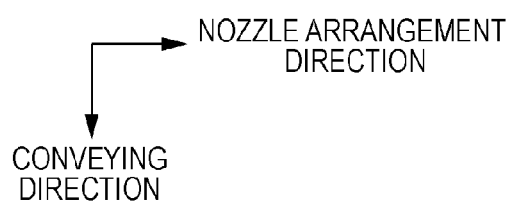
FIG. 9 is a diagram showing an example of image data of each plane after index expansion.
Figure 9A:
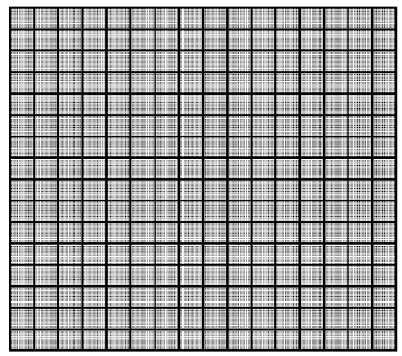
Figure 9B:
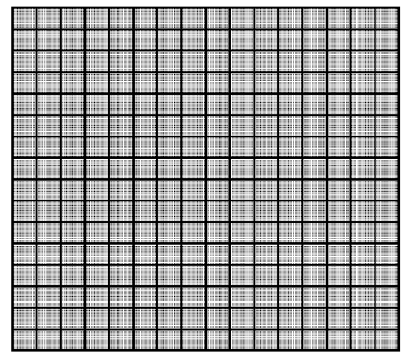
Figure 10A:
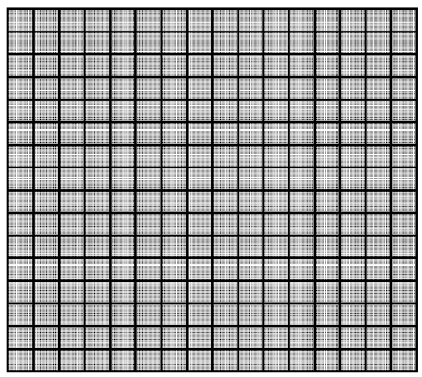
FIG. 10 is a diagram showing image data in which image data of each plane is distributed into arrays.
Figure 10C:
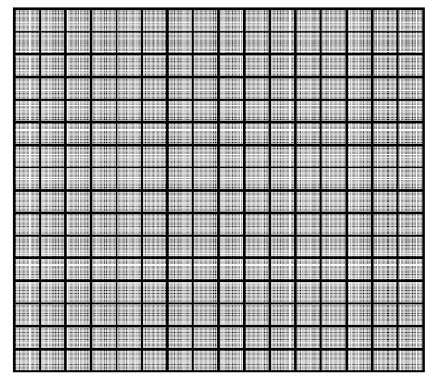
Figure 10B:
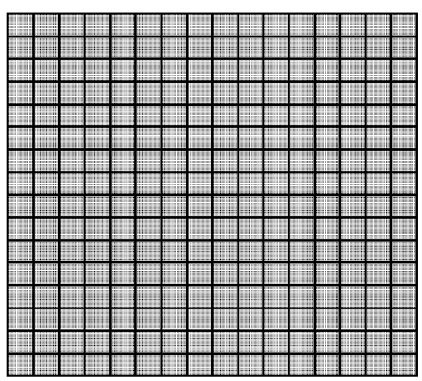
Figure 10D:
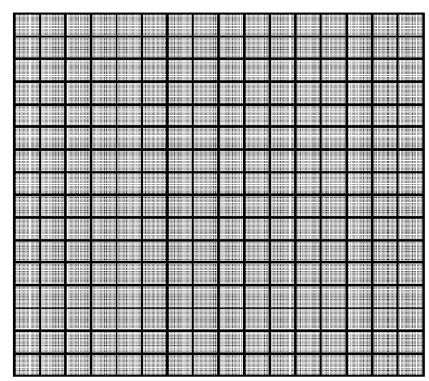

FIG. 9 shows an example of the image data of each plane after the index expansion in the overlapped portion. FIG. 9A is the image data of the plane 1 and FIG. 9B is the image data of the plane 2. These image data have a resolution of 1200 dpi×1200 dpi, a size of 16 pixels×16 pixels, and 3 gray levels. Specifically, the image data is represented by 3 gray levels in which one pixel is represented by two dots, one dot, or no dot. Here, all the pixels are one dot data.

Return to FIG. 5. The 3-gray-level data of 1200 dpi×1200 dpi expanded by using the index expansion table is distributed to each array by the array distribution processor J09. Here, the data is distributed to each array so that approximately the same number of dots are included in each array by using a random mask, an array distribution table, or the like.

FIG. 10 shows the image data obtained by distributing the image data of each plane after the index expansion described in FIG. 9 to each array by the array distribution processor J09. The array distribution processor J09 has a function to distribute the image data of the plane 1 to the nozzle arrays of the first chip and the nozzle arrays of the second chip. The array distribution processor J09 corresponds to a second distribution unit. FIG. 10A shows image data of the array A of the first chip, FIG. 10B shows image data of the array B of the first chip, FIG. 10C shows image data of the array A of the second chip, and FIG. 10D shows image data of the array B of the second chip. In this embodiment, one nozzle array corresponds to one plane, so that the image data does not change between before and after the array distribution processor J09.

Figure 11A:
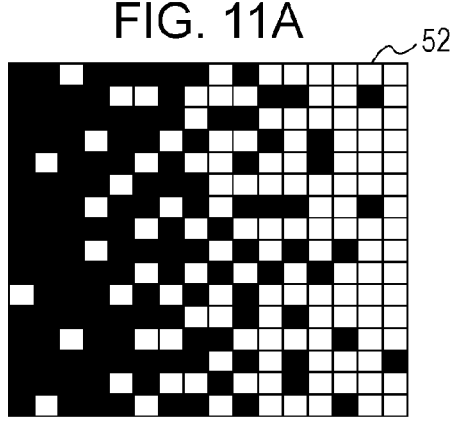
FIG. 11 is a diagram showing examples of masks different for each plane in the same chip.
Figure 11C:
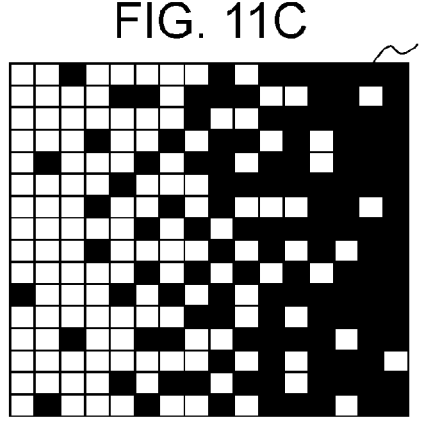
Figure 11B:
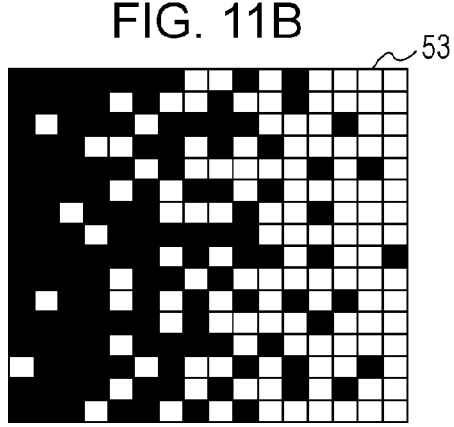
Figure 11D:
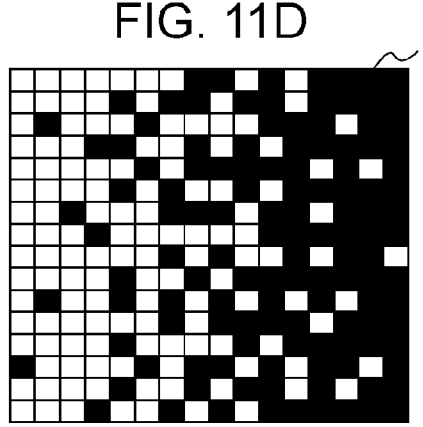

Next, a mask processor J11 performs mask processing on the data distributed to each array in the overlapped portion. Although masks according to this embodiment will be described later in FIG. 17 and the following figures, first, an operation will be described which is one of the features of this embodiment and in which masks different from each other at least for a part thereof are applied respectively to the planes in the same chip. FIG. 11 is a diagram showing examples of the masks which are applied respectively to the planes in the same chip and different from each other at least for a part thereof. In FIG. 11, the pixels shown by black boxes are pixels of "ON" on which image data is allowed to be recorded, and the pixels shown by white boxes are pixels of "OFF" on which image data is not allowed to be recorded. FIG. 11A shows a mask 52 applied to the array A in the first chip and FIG. 11B shows a mask 53 applied to the array B in the first chip. In the same way, FIG. 11C shows a mask 54 applied to the array A in the second chip and FIG. 11D shows a mask 55 applied to the array B in the second chip. The size of the masks is 1200 dpi×1200 dpi and 16 pixels×16 pixels. The masks are repeatedly applied in the conveying direction. In these masks, bit of black pixel is "1", and an effect of "ON" occurs when computing the logical AND of the bit and image data. Bit of white pixel is "0", and an effect of "OFF" occurs when computing the logical AND of the bit and image data. The mask 1 (52) and the mask 3 (54) are exclusive to each other, and in the same way, the mask 2 (53) and the mask 4 (55) are exclusive to each other.

Figure 12:
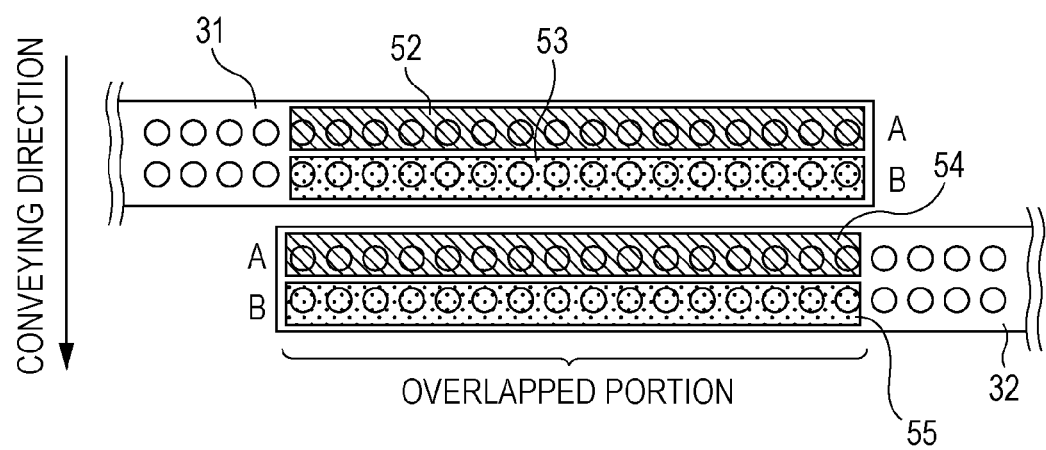
FIG. 12 is a diagram for explaining an outline of mask processing.
Figure 13A:
FIG. 13 is a diagram showing image data of each nozzle array processed by the masks in FIG. 11.
Figure 13A:
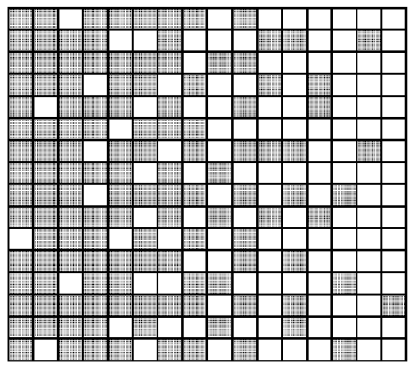
Figure 13C:
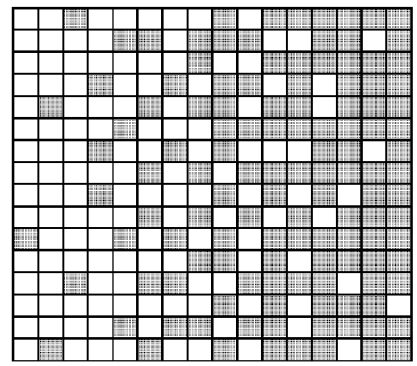
Figure 13B:
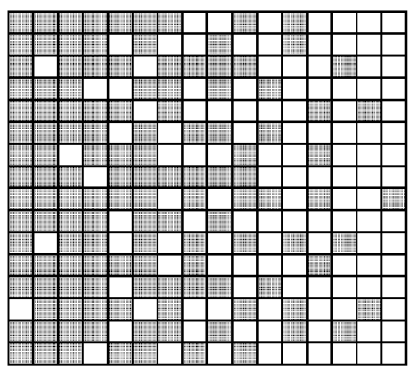
Figure 13D:
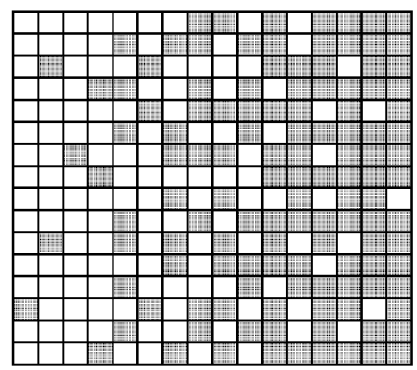

FIG. 12 is a diagram for explaining an outline of the mask processing. Here, the masks described in FIG. 11 are applied to each array in the overlapped portion. Specifically, the mask 1 (52) is applied to the array A in the first chip and the mask 2 (53) is applied to the array B in the first chip. In the same way, the mask 3 (54) is applied to the array A in the second chip and the mask 4 (55) is applied to the array B in the second chip.

FIG. 13 shows image data of each nozzle array masked by the mask processor J11. In FIG. 13, a pixel on which no dot is recorded is indicated by a white box, a pixel on which one dot is recorded is indicated by a gray box, and a pixel on which two dots are recorded is indicated by a black box. Here, only pixels on which no dot is recorded and pixels on which one dot is recorded are generated. FIG. 13A shows the masked image data of the array A of the first chip, FIG. 13B shows the masked image data of the array B of the first chip, FIG. 13C shows the masked image data of the array A of the second chip, and FIG. 13D shows the masked image data of the array B of the second chip.

Here, as described above, one of the features in the mask application method according to this embodiment is to use masks different from each other at least for a part thereof are applied respectively to the planes in the same chip. By using this configuration, it is possible to distribute image data so that overlapped dots are present between the chips and suppress fluctuation of dot coverage rate on the surface of the sheet even when the registration misalignment occurs between the first chip and the second chip. Although the masks of each nozzle array are different from each other in this embodiment, it is not an indispensable condition that all the masks of a plurality of nozzle arrays are different from each other to make the overlapped dots. For example, when allocating 16 nozzle arrays of one chip to 4 planes, a part of the masks of the nozzles located in different planes respectively should be different from each other, and the masks in the same plane can be completely the same. Although this embodiment uses an example in which image data is distributed to each chip by using masks, image data only has to be distributed so that overlapped dots are present between the chips, and distribution units are not limited to masks.

Figure 14A:
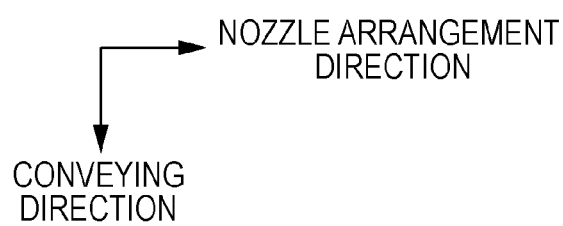
FIG. 14 is a diagram showing a state in which image data of each nozzle array are overlapped with each other in each chip.
Figure 14A:
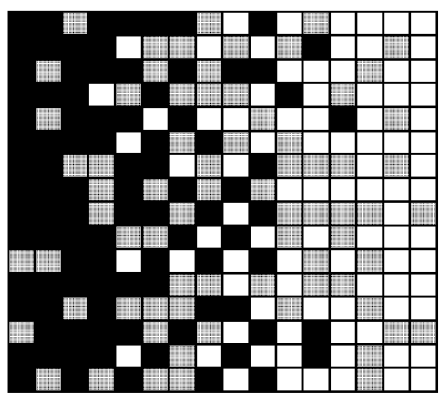
Figure 14B:
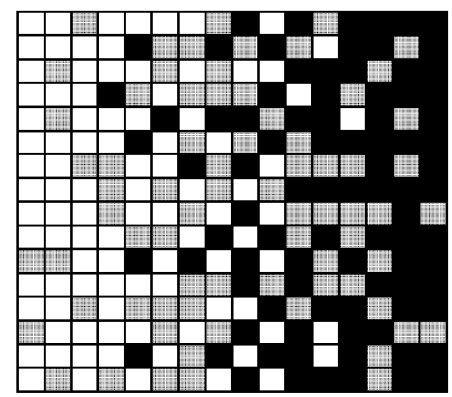

Next, FIG. 14 is a diagram showing a state in which image data of each nozzle array in FIG. 13 are overlapped with each other in each chip. In FIG. 14, a pixel on which no dot is recorded is indicated by a white box, a pixel on which one dot is recorded is indicated by a gray box, and a pixel on which two dots are recorded (a pixel on which overlapped two dots are recorded) is indicated by a black box. FIG. 14A shows overlaps of the dots in the first chip and corresponds to J12 (recording data for the first chip) in FIG. 5. FIG. 14B shows overlaps of the dots in the second chip and corresponds to recording data for the second chip.

Figure 15A:
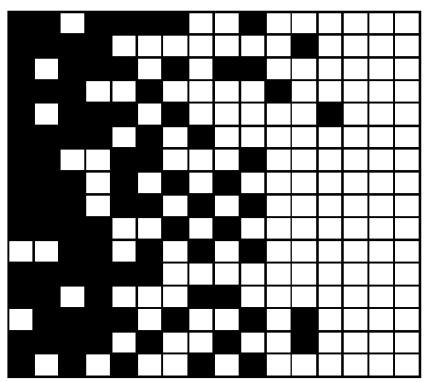
FIG. 15 is a diagram in which portions where two dots are overlapped are extracted from recording data for each chip in FIG. 14 and displayed.
Figure 15B:
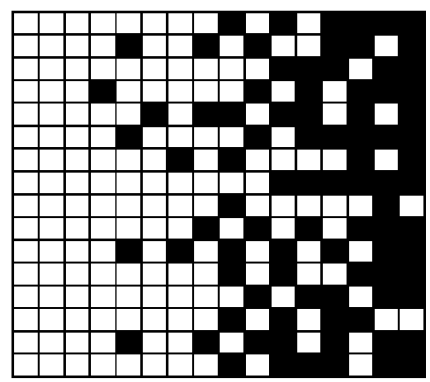
Figure 15C:
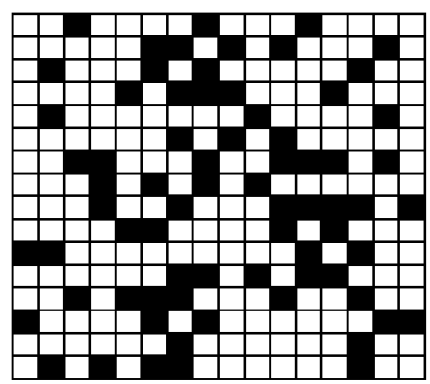

FIG. 15 is a diagram in which portions where two dots are overlapped are extracted from recording data for each chip in FIG. 14 and displayed so as to explain the positions of the pixels on which two dots are overlapped. In FIG. 15, pixels shown by black boxes indicate the portions where two dots are overlapped. FIG. 15A is a diagram in which portions where two dots are overlapped in the first chip are extracted from FIG. 14A, and FIG. 15B is a diagram in which portions where two dots are overlapped in the second chip are extracted from FIG. 14B. FIG. 15C is a diagram showing portions where dots are overlapped between the chips. When calculating FIG. 15C, pixels on which two dots are not overlapped in the first chip and the second chip are defined as pixels on which dots are overlapped between the chips because, when two planes of the image data after the index expansion are overlapped, two dots are overlapped in 1200 dpi. According to FIG. 15, as a result of applying masks different from each other at least for a part thereof between planes in the same chip, overlapped dots between the chips can be obtained.

By the above processing, the dot arrangements recorded by the first chip and the second chip are not exclusive to each other, and a dot arrangement can be created so that a part of dots are overlapped between the chips and a part of dots are not overlapped between the chips.

Figure 16A:
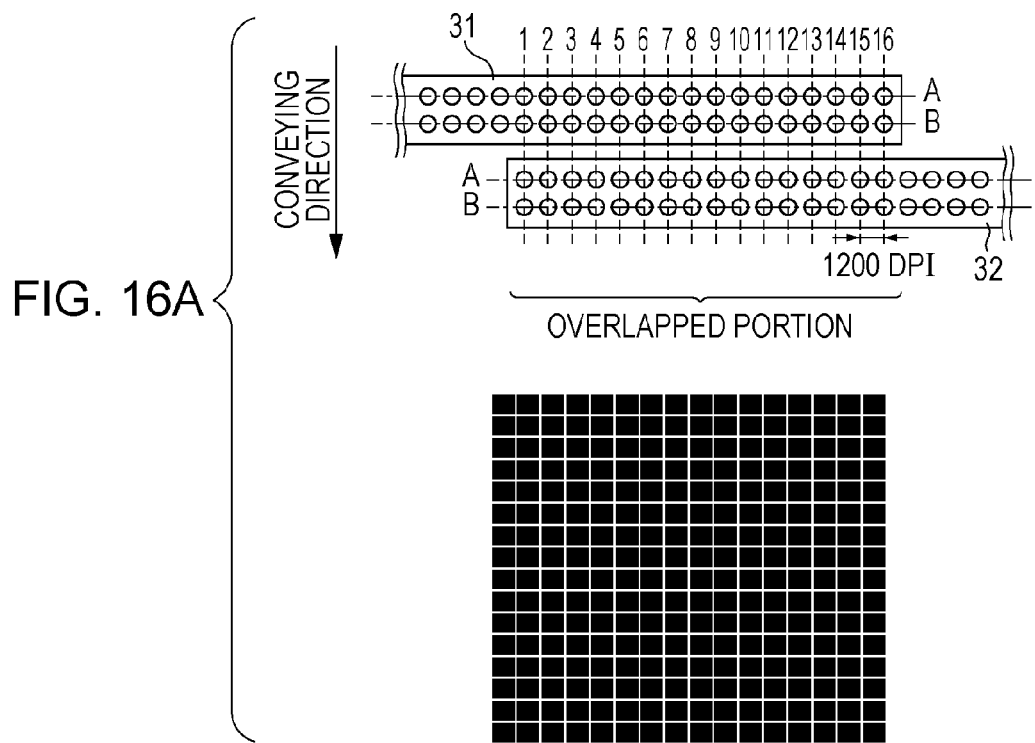
FIG. 16 is a schematic diagram showing a position relationship between chips and a dot arrangement on a paper sheet.
Figure 16B:
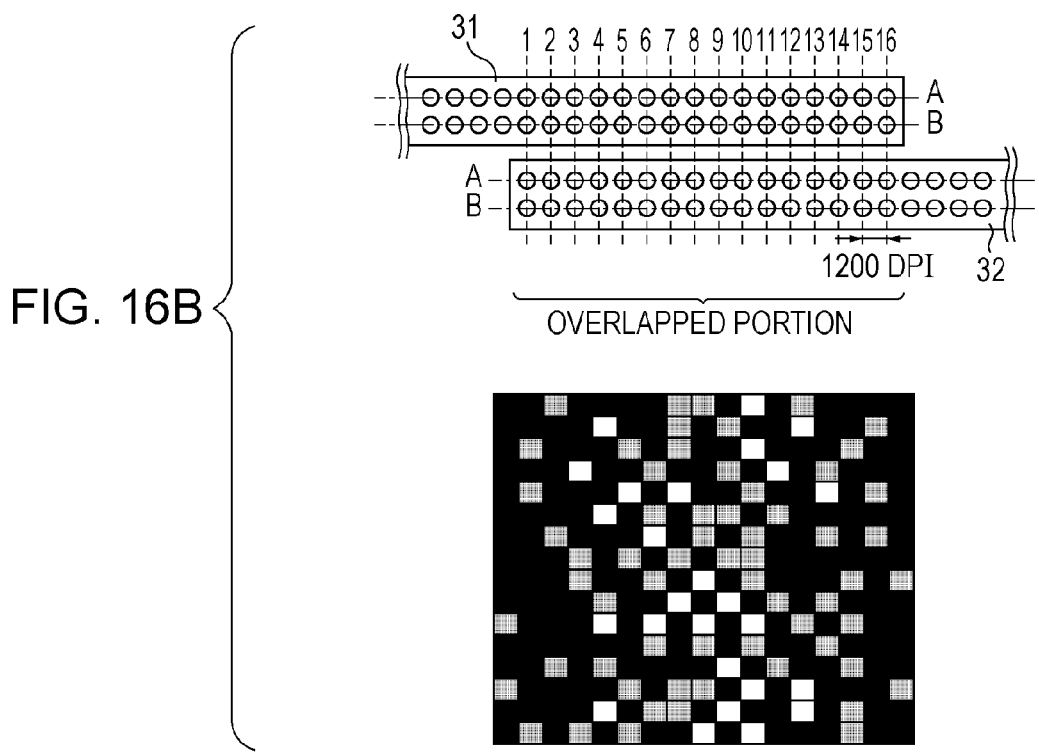
Figure 17A:
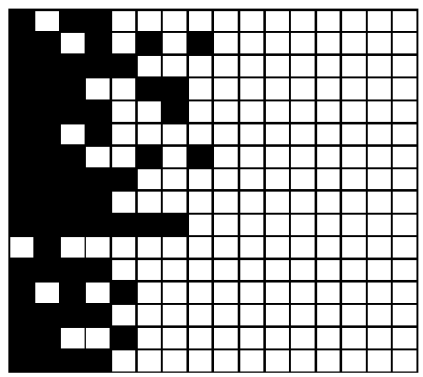
FIG. 17 is a diagram for explaining masks according to the first embodiment.
Figure 17C:
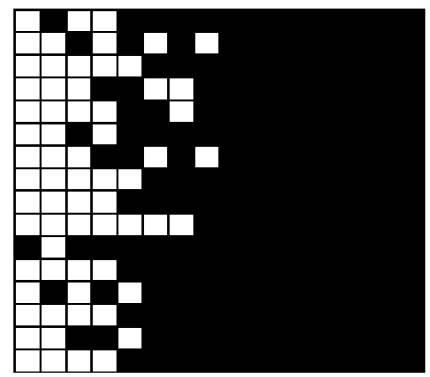
Figure 17B:
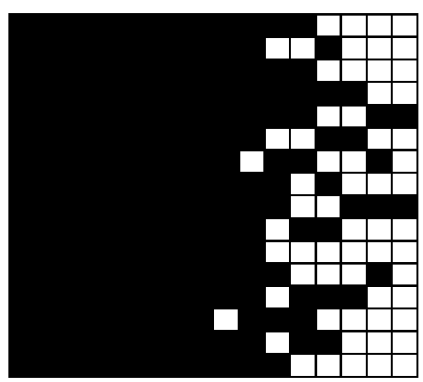
Figure 17D:
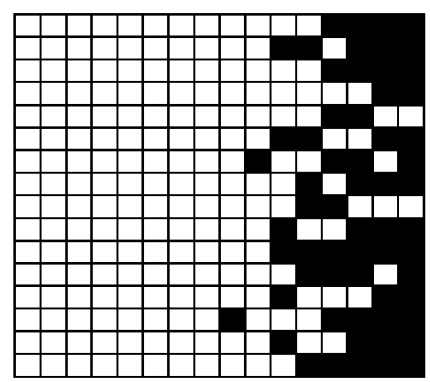
Figure 18A:
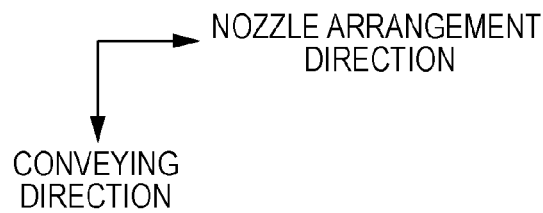
FIG. 18 is a diagram showing image data after mask processing using the masks according to the first embodiment.
Figure 18A:
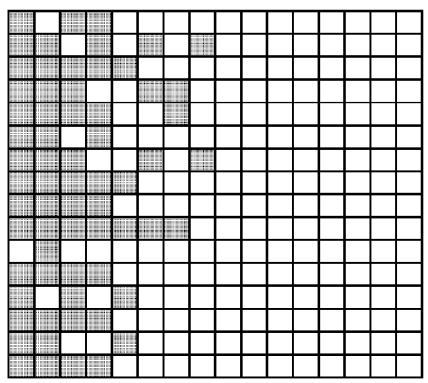
Figure 18C:
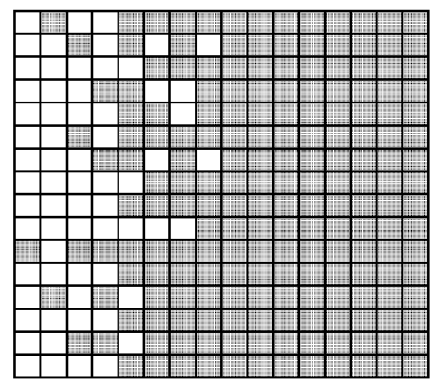
Figure 18B:
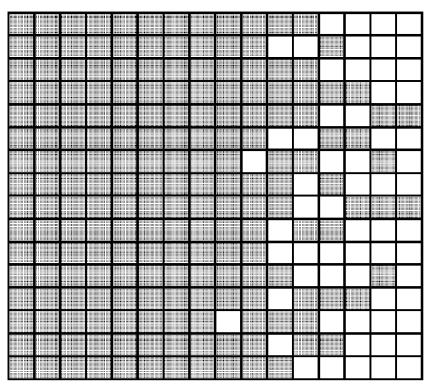
Figure 18D:
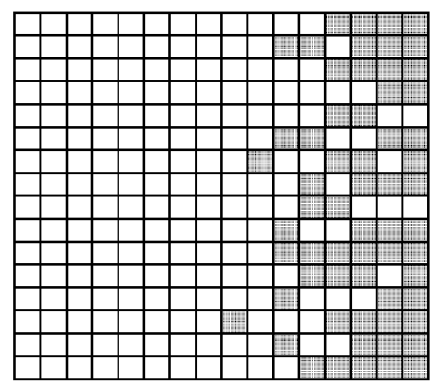

FIG. 16A is a schematic diagram showing a position relationship between the chips when there is no registration misalignment between the chips and FIG. 16B is a diagram showing a dot arrangement on a paper sheet when there is registration misalignment between the chips. FIG. 16A shows a case in which no registration misalignment occurs between the chips and FIG. 16B shows a case in which registration misalignment of one pixel at 1200 dpi occurs in the nozzle arrangement direction. In FIGS. 16A and 16B, a pixel on which no dot is recorded is indicated by a white box, a pixel on which one dot is recorded is indicated by a gray box, and a pixel on which two dots are recorded (a pixel on which overlapped two dots are recorded) is indicated by a black box.

From the dot arrangement on the paper sheet in FIG. 16B, it is understood that the number of pixels of "0" dot in 1200 dpi is suppressed (refer to comparative example described below) because there are overlapped dots between the chips. This is because the first chip and the second chip are not completely exclusive to each other (there are overlapped dots between the chips), and this case is different from a case in which they are completely exclusive to each other (there are no overlapped dots between the chips). Specifically, dots of the first chip and dots of the second chip which would not have been overlapped if the registration misalignment had not occurred are overlapped. On the other hand, dots which would have been overlapped if the registration misalignment had not occurred are misaligned and portions of "0" dot on the paper sheet are filled with dots. In other words, even when the registration misalignment between the chips occurs, it is possible to suppress fluctuation of dot coverage rate on the surface of the paper sheet. Therefore, according to this embodiment, by generating dots which are overlapped and recorded by the first chip and the second chip, fluctuation of the image density in the overlapped portion is reduced when determining the image density in a certain range of area. Based on this, even when a chip mounting error, a head mounting error, and/or a fluctuation of conveying amount of a recording medium occur, fluctuation of image density due to these errors and/or fluctuation can be suppressed.

However, as shown in FIG. 16B, when applying the masks of FIG. 11, in a state where the registration misalignment occurs, pixels of "0" dot are concentrated to some extent in the center portion of the connection portion of the chips. This means that the dot coverage rate on the surface of the paper sheet is reduced in the center portion of the connection portion of the chips and a slight white stripe appears even though the white stripe is suppressed to some extent by the effect of the overlapped dots between the chips. This is a phenomenon caused by applying the same gradation mask to each plane (each array) of the same chip and distributing data to the nozzle arrays.

FIG. 17 shows masks applied the array A and the array B of the first chip and the second chip. FIG. 17A shows a mask of the array A of the first chip, FIG. 17B shows a mask of the array B of the first chip, FIG. 17C shows a mask of the array A of the second chip, and FIG. 17D shows a mask of the array B of the second chip.

Here, commonality and difference between the masks of this embodiment and the masks shown in FIG. 11 are as follows. The commonality is that different masks are used in at least a part of a plurality of nozzle arrays (planes) in the same chip. The difference is that gradation masks having different gradients are applied to each plane (each array) in the same chip, and different distribution methods are used for each array.

FIG. 18 shows image data after the mask processing using the masks according to this embodiment. FIG. 18A shows the masked image data of the array A of the first chip, FIG. 18B shows the masked image data of the array B of the first chip, FIG. 18C shows the masked image data of the array A of the second chip, and FIG. 18D shows the masked image data of the array B of the second chip.

Figure 19A:
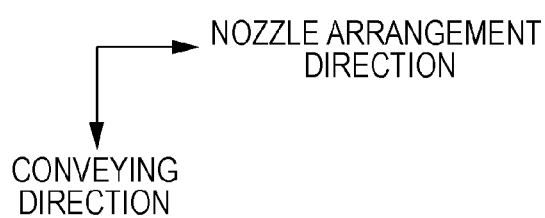
FIG. 19 is a diagram showing a state in which image data of each nozzle array in FIG. 18 are overlapped with each other in each chip.
Figure 19A:
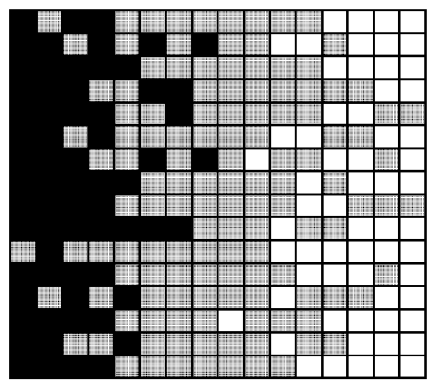
Figure 19B:
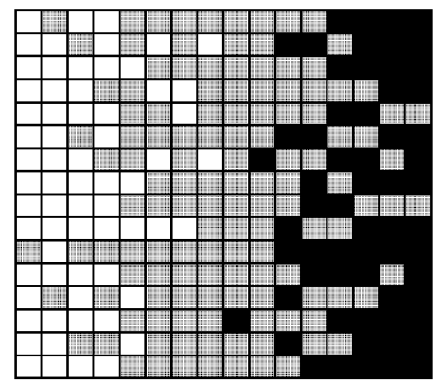
Figure 20A:
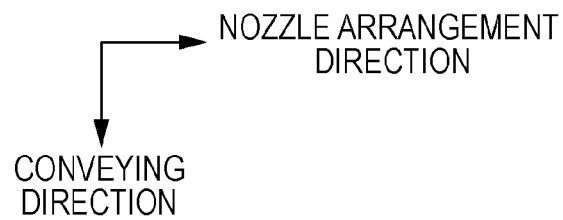
FIG. 20 is a diagram in which portions where two dots are overlapped are extracted from recording data for each chip in FIG. 19 and displayed.
Figure 20A:
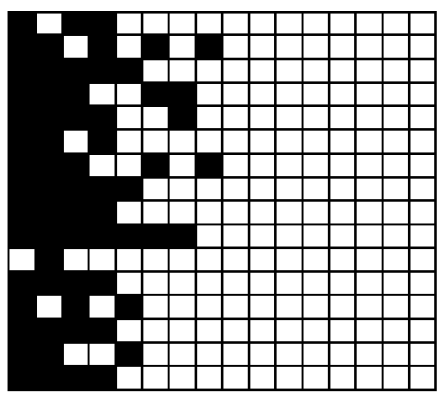
Figure 20B:
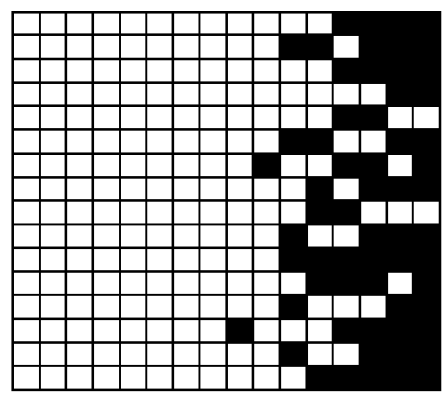
Figure 20C:
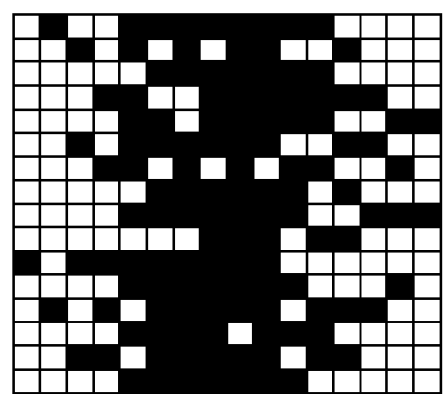

FIG. 19 is a diagram showing a state in which image data of each nozzle array in FIG. 18 are overlapped with each other in each chip. FIG. 19A shows overlaps of the dots in the first chip and corresponds to J12 (recording data for the first chip) in FIG. 5. FIG. 19B shows overlaps of the dots in the second chip and corresponds to recording data for the second chip.

FIG. 20 is a diagram in which portions where two dots are overlapped are extracted from recording data for each chip in FIG. 19 and displayed so as to explain the positions of the pixels on which two dots are overlapped. FIG. 20A is a diagram in which portions where two dots are overlapped in the first chip are extracted from FIG. 19A, and FIG. 20B is a diagram in which portions where two dots are overlapped in the second chip are extracted from FIG. 19B. FIG. 20C is a diagram showing portions where dots are overlapped between the chips.

The reason why the positions of the pixels on which two dots are overlapped in FIG. 20 are different from those in FIG. 15 is because different gradients of gradation are used for each array (each plane) in the same chip and thus the number of overlapped dots and distribution of overlapped dots are changed between the chips. Specifically, as shown in FIG. 20C, the amount of overlapped dots between the chips increases, and further it is understood that the positions of the pixels on which dots are overlapped are largely distributed in particular to the center portion of the overlapped portion.

Figure 21A:
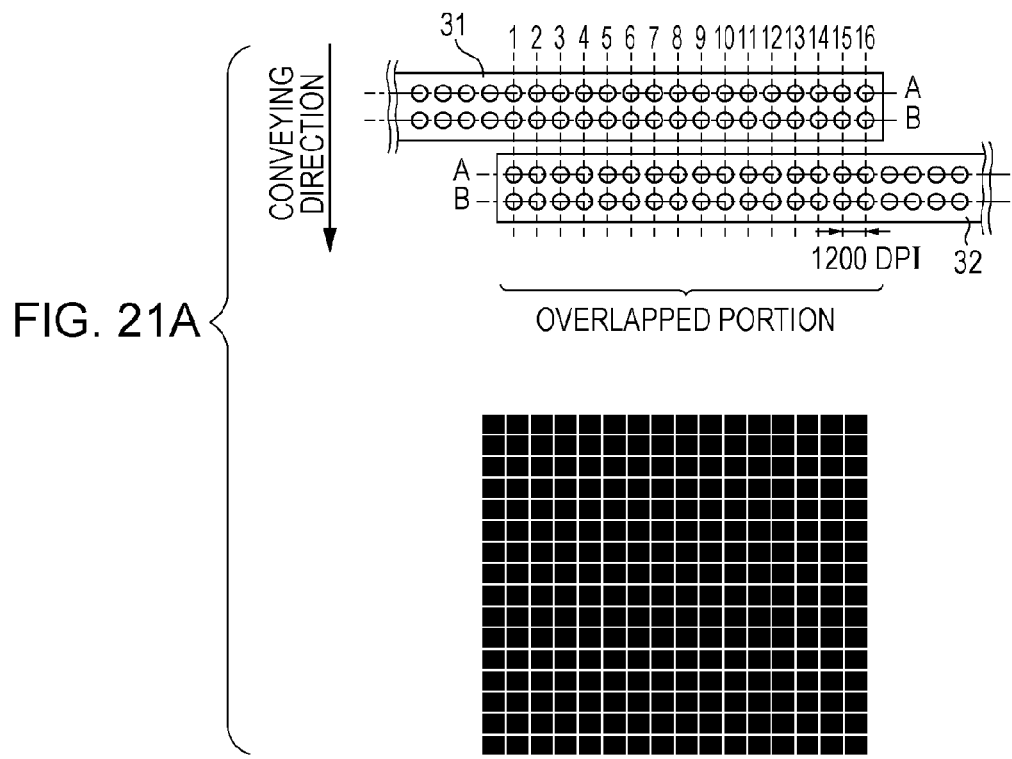
FIG. 21 is a schematic diagram showing a position relationship between chips and a dot arrangement on a paper sheet according to the first embodiment.
Figure 21B:
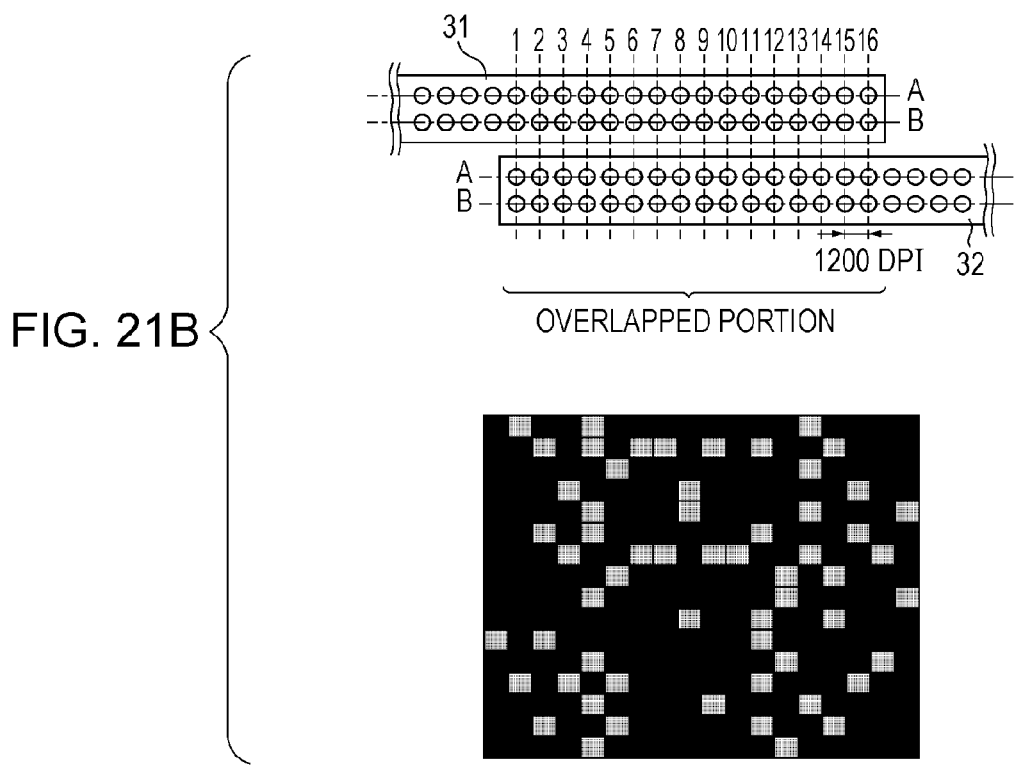

FIG. 21A is a schematic diagram showing a position relationship between the chips when there is no registration misalignment between the chips and FIG. 21B is a diagram showing a dot arrangement on a paper sheet when there is registration misalignment between the chips in this embodiment. FIG. 21A shows a case in which no registration misalignment occurs between the chips and FIG. 21B shows a case in which registration misalignment of one pixel at 1200 dpi occurs in the nozzle arrangement direction.

From the dot arrangement on the paper sheet in FIG. 21B, it is understood that there is no "0" dot which is present when the mask patterns of FIG. 11 are used. This is because the overlapped dots between the chips increase especially in the center position of the connection portion of the chips. As described above, in this embodiment, by using different distribution methods for each plane in the same chip and adjusting gradients of gradation of the masks for each plane (nozzle array), the amount of overlapped dots between the chips in the overlapped portion can be adjusted. Therefore, it is possible to solve the problem that the nearer the center of the overlapped portion it is, the greater the number of dots where the registration misalignment occurs between the chips is. In other words, it is possible to perform adjustment in which overlapped dots between the chips are intensively generated in a portion in which the number of dots where the registration misalignment occurs is large.

The gradation mask is a mask in which, with respect to two chips forming an overlapped portion, a recording density of one chip gradually decreases toward one end of the overlapped portion and a recording density of the other chip gradually increases toward the one end. The gradient of the gradation mask corresponds to an increasing rate or a decreasing rate for a predetermined nozzle unit of an acceptable recording rate (recording duty) determined by the mask.

Comparative Example

Figure 22A:
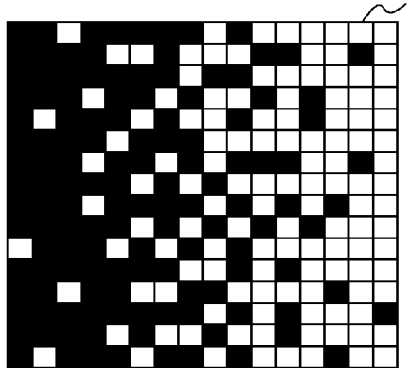
FIG. 22 is a diagram showing masks applied to each array of each chip according to a comparative example.
Figure 22C:
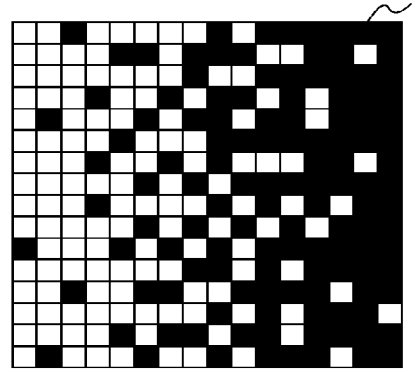
Figure 22B:
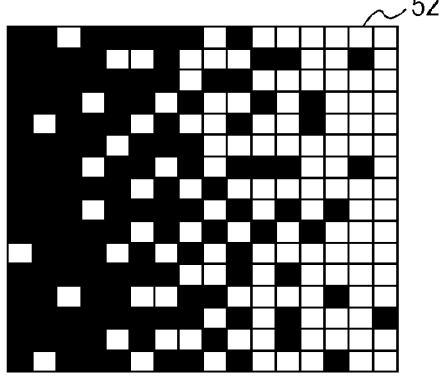
Figure 22D:
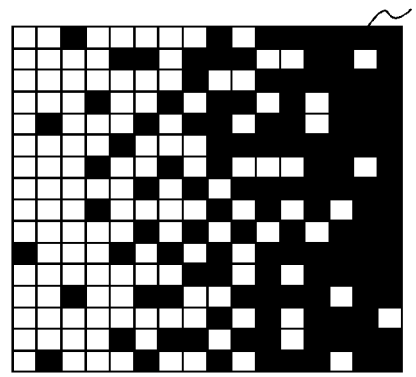
Figure 23A:
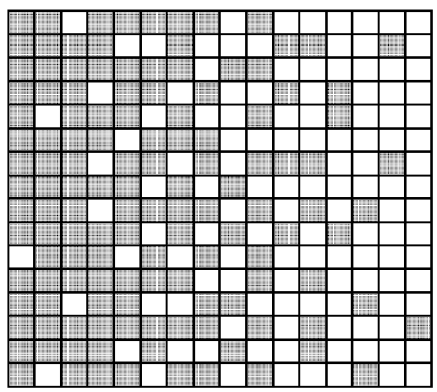
FIG. 23 is a diagram showing image data processed by the masks according to the comparative example.
Figure 23C:
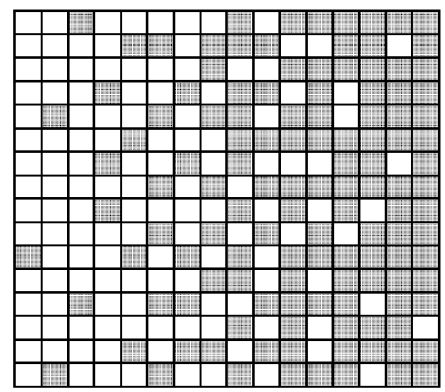
Figure 23B:
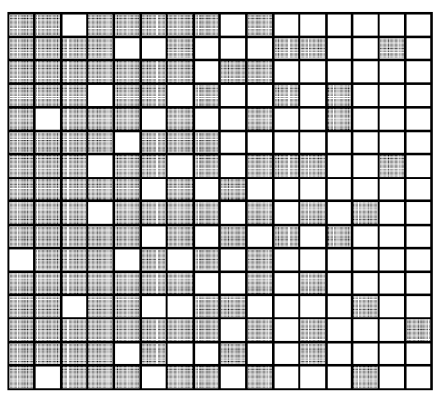
Figure 23D:
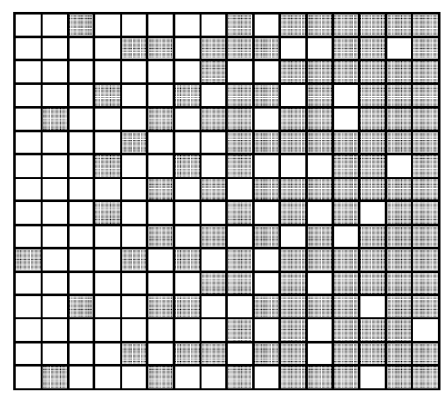

In a comparative example, a case in which there is no overlapped dot between the chips will be described. FIG. 22 shows masks applied to each array of each chip according to the comparative example. FIG. 22A shows a mask 52 of the array A of the first chip, FIG. 22B shows a mask 52 of the array B of the first chip, FIG. 22C shows a mask 54 of the array A of the second chip, and FIG. 22D shows a mask 54 of the array B of the second chip. The difference from the above embodiment is that the same mask is used in each plane (each array) in the same chip.

FIG. 23 shows image data obtained by performing mask processing on the nozzle arrays of each chip using the masks shown in FIG. 22 in the comparative example. FIG. 23A shows the masked image data of the array A of the first chip, FIG. 23B shows the masked image data of the array B of the first chip, FIG. 23C shows the masked image data of the array A of the second chip, and FIG. 23D shows the masked image data of the array B of the second chip.

Figure 24A:
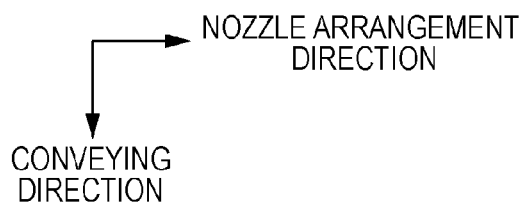
FIG. 24 is a diagram showing a state in which image data of each nozzle array are overlapped with each other in each chip according to the comparative example.
Figure 24A:
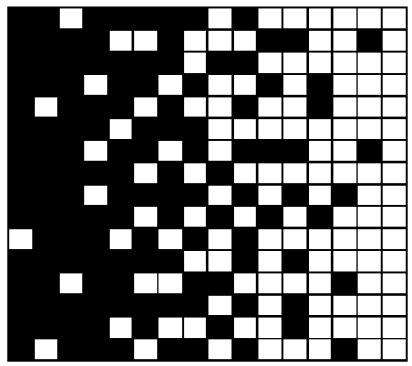
Figure 24B:
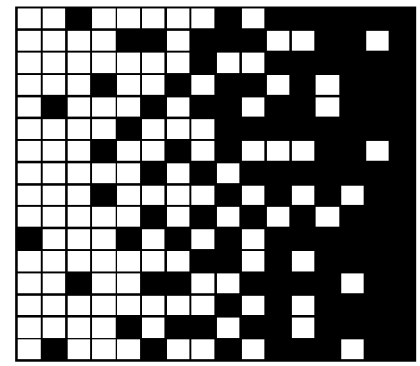

FIG. 24 is a diagram showing a state in which image data of each nozzle array in FIG. 23 are overlapped with each other in each chip. FIG. 24A shows overlaps of the dots in the first chip and corresponds to J12 (recording data for the first chip) in FIG. 5. FIG. 24B shows overlaps of the dots in the second chip and corresponds to recording data for the second chip.

FIG. 25 is a diagram in which portions where two dots are overlapped are extracted from recording data for each chip in FIG. 24 and displayed so as to explain the positions of the pixels on which two dots are overlapped. FIG. 25A is a diagram in which portions where two dots are overlapped in the first chip are extracted from FIG. 24A, and FIG. 25B is a diagram in which portions where two dots are overlapped in the second chip are extracted from FIG. 24B. FIG. 25C is a diagram showing portions where dots are overlapped between the chips.

In FIG. 25, the difference from the first embodiment is that overlapped dots are present only in a chip and overlapped dots are not present at all between the chips because a completely identical mask is applied to each array (each plane) in the same chip.

Figure 26A:
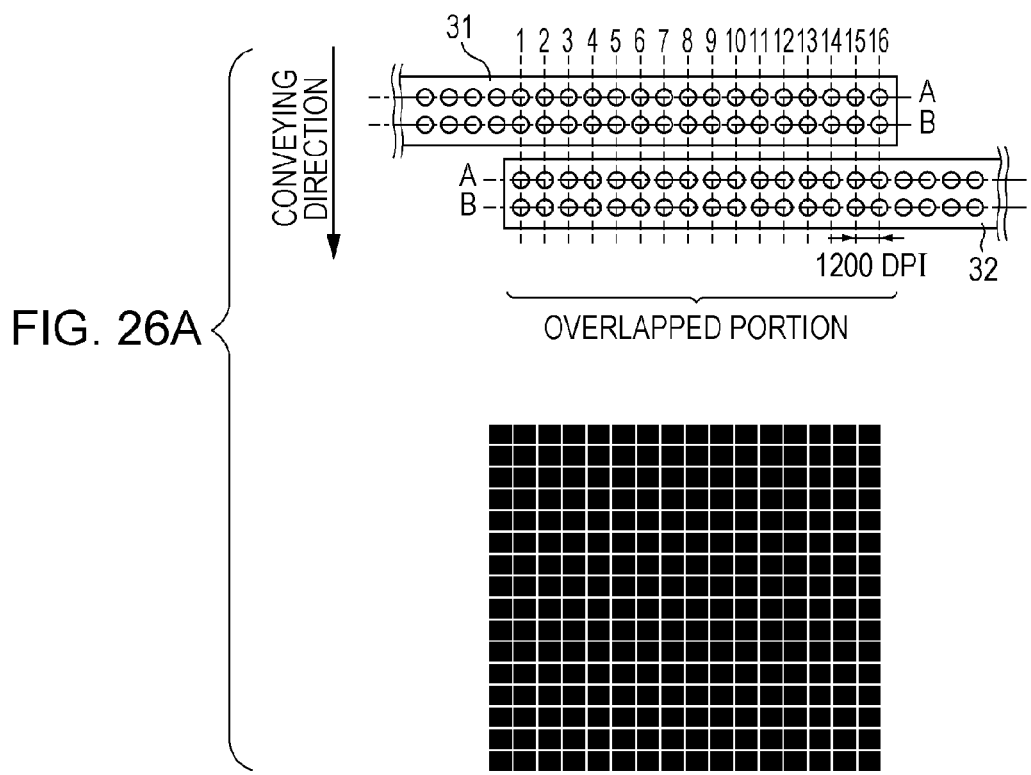
FIG. 26 is a schematic diagram showing a position relationship between chips and a dot arrangement on a paper sheet according to the comparison example.
Figure 26B:
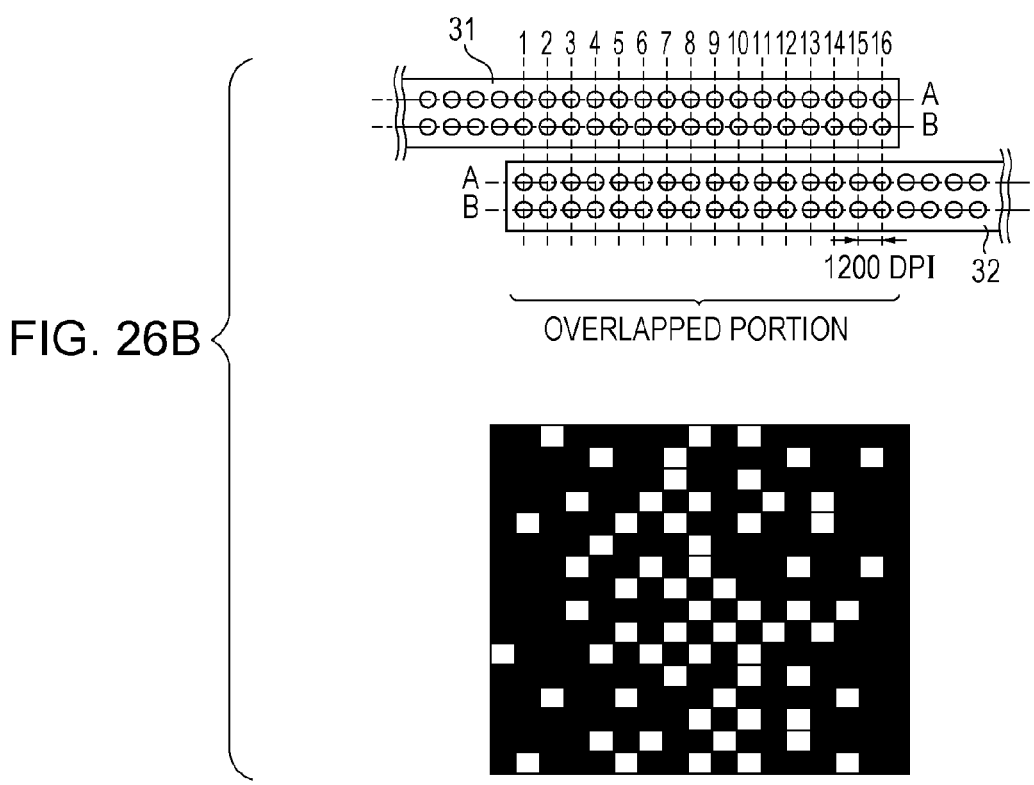

FIG. 26A is a schematic diagram showing a position relationship between the chips when there is no registration misalignment between the chips and FIG. 26B is a diagram showing a dot arrangement on a paper sheet when there is registration misalignment between the chips in the comparative example. FIG. 26A shows a case in which no registration misalignment occurs between the chips and FIG. 26B shows a case in which registration misalignment of one pixel at 1200 dpi occurs in the nozzle arrangement direction. From the dot arrangement on the paper sheet in FIG. 26B, it is understood that the number of pixels of "0" dot in 1200 dpi is large because there are no overlapped dots between the chips.

This is because the first chip and the second chip are completely exclusive to each other (there are no overlapped dots between the chips), and thus when the registration misalignment occurs, an area of "0" dot on the paper sheet changes only in an increasing direction. In other words, when the registration misalignment between the chips occurs, the dot coverage rate on the surface of the paper sheet only decreases. Therefore, when determining image density in an area having a certain size, there is a significant decrease in the image density in the connection portion. Based on this, when a chip mounting error, a head mounting error, and/or a fluctuation of conveying amount of a recording medium occur, fluctuation of image density due to these errors and/or fluctuation occurs.

Second Embodiment

Next, a second embodiment of the present invention will be described. The same reference symbols are given to the same constituent elements as those described in the first embodiment, and the description thereof will be omitted.

Figure 27:
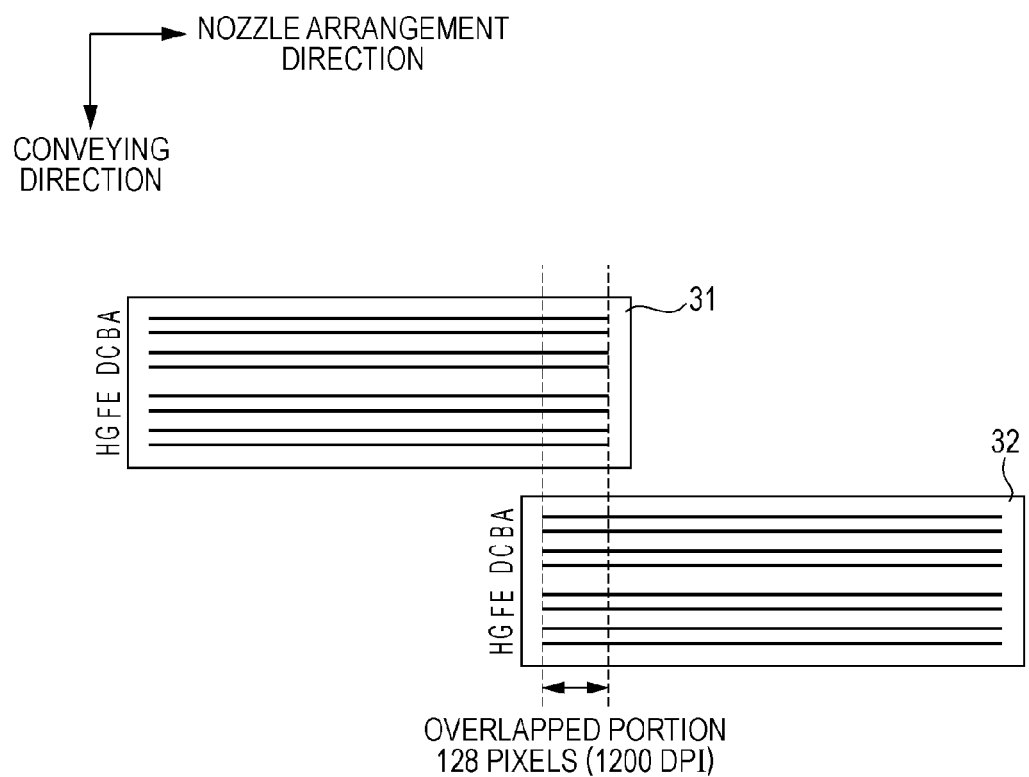
FIG. 27 is a diagram for explaining an outline of a connected head according to a second embodiment.

FIG. 27 is a diagram for explaining an outline of a connected head according to this embodiment. In FIG. 27, in the connected head, a plurality of chips including the first chip 31 and the second chip 32 are arranged in a zigzag pattern in a direction crossing the conveying direction. In each chip, a plurality of nozzle arrays are arranged in a direction perpendicular to the conveying direction. Each chip includes a plurality of nozzle arrays, and a part of nozzles of the first chip and the second chip are arranged to be overlapped with each other. In this example, the nozzle interval is 1200 dpi, the number of nozzle arrays in each chip is 8, and the number of nozzles in the overlapped portion is 128. The nozzle arrays are referred to as A to H in an order from the upstream side nozzle array in the conveying direction.

Figure 28:
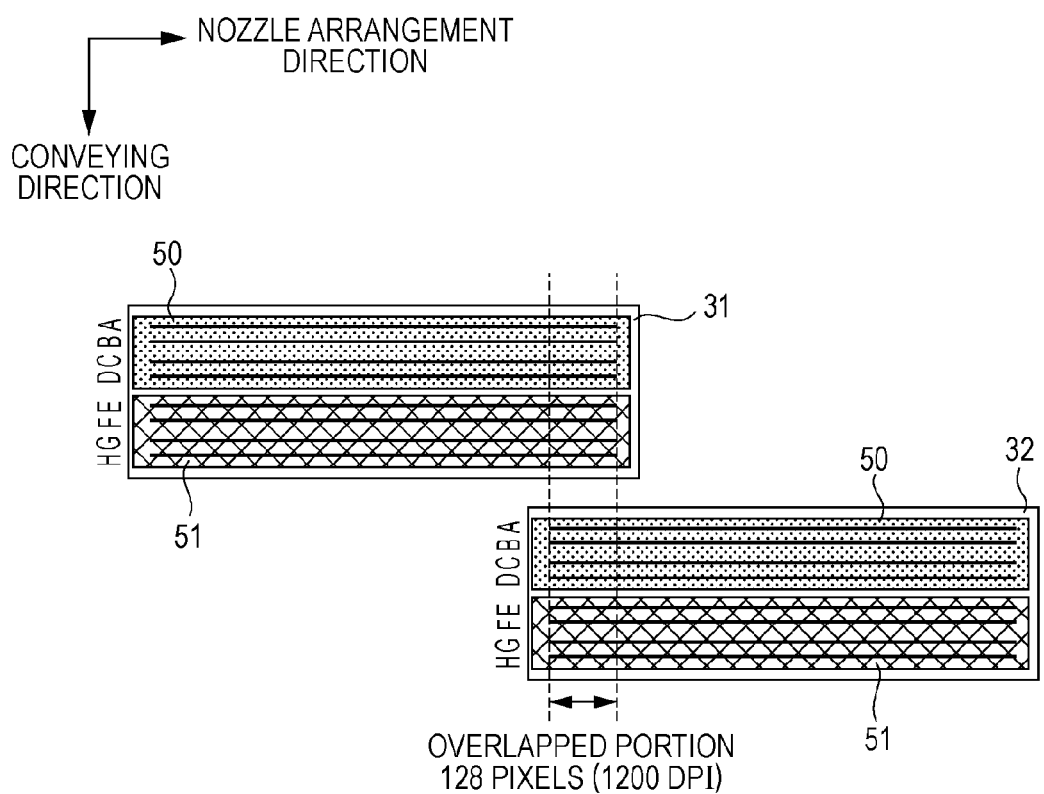
FIG. 28 is a diagram showing a correspondence relationship between a plane and nozzle arrays.

Next, FIG. 28 is a diagram showing a correspondence relationship between a plane and nozzle arrays. In this example, the number of divided planes is 2. Data of a plane 1 is assigned to 4 arrays A to D and data of a plane 2 is assigned to 4 arrays E to H.

Figure 29:
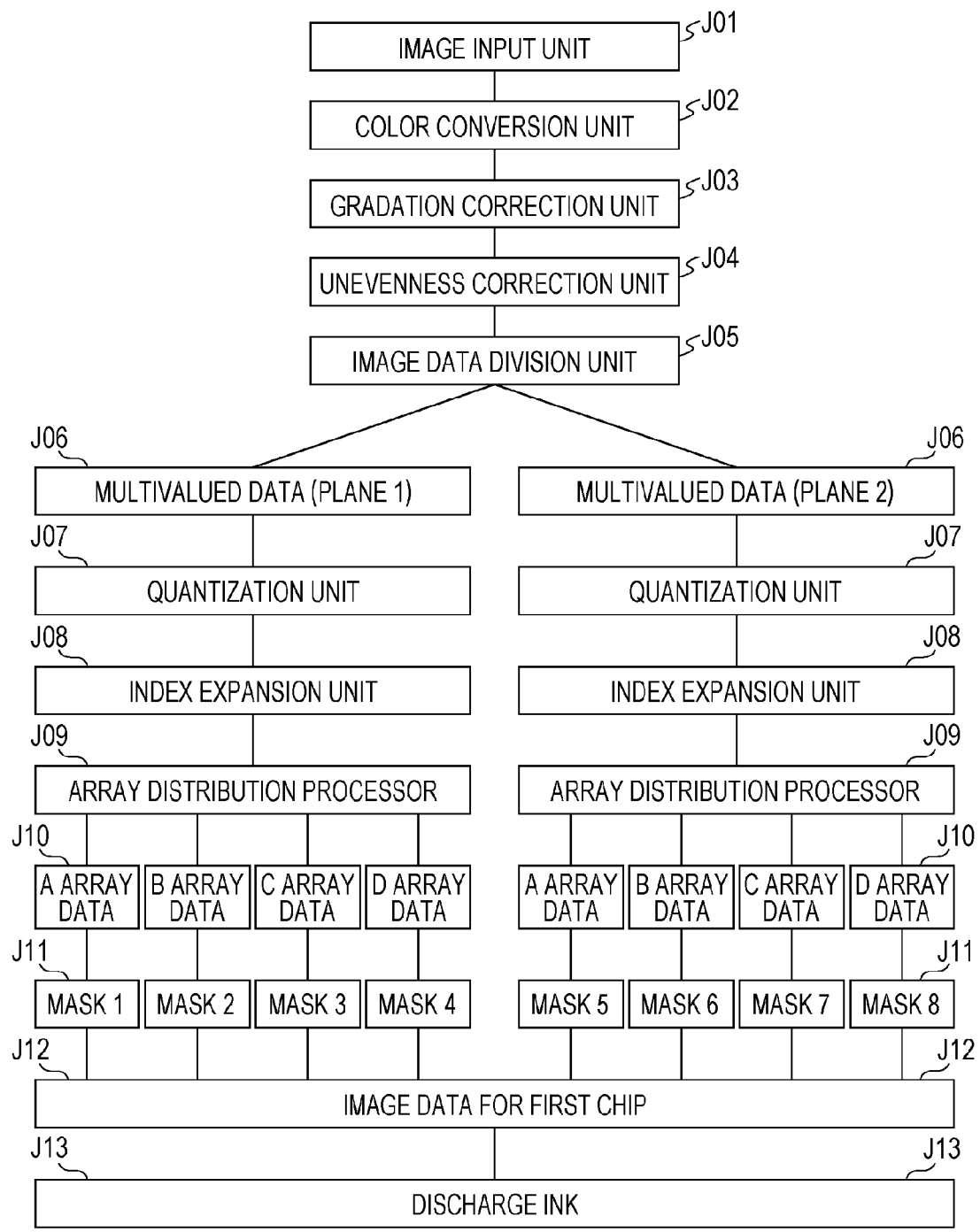
FIG. 29 is a diagram showing a process for processing image data according to the second embodiment.

FIG. 29 is a diagram showing an image data processing flow of the first chip according to this embodiment. The difference from the first embodiment is that the number of the nozzle arrays included in one chip is 8 and masks can be applied to each nozzle array individually. An image data processing flow of the second chip is the same as that of the first chip.

Figure 30A:
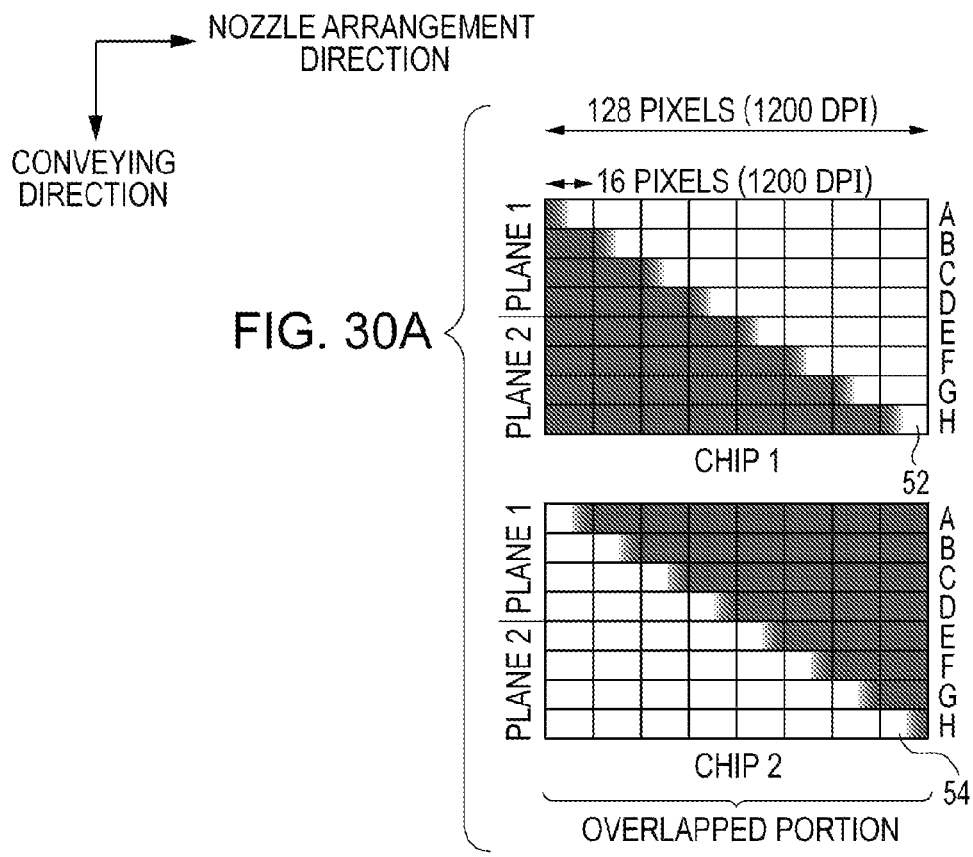
FIG. 30 is a diagram for explaining an example in which masks are applied to an overlapped portion according to the second embodiment.
Figure 30B:
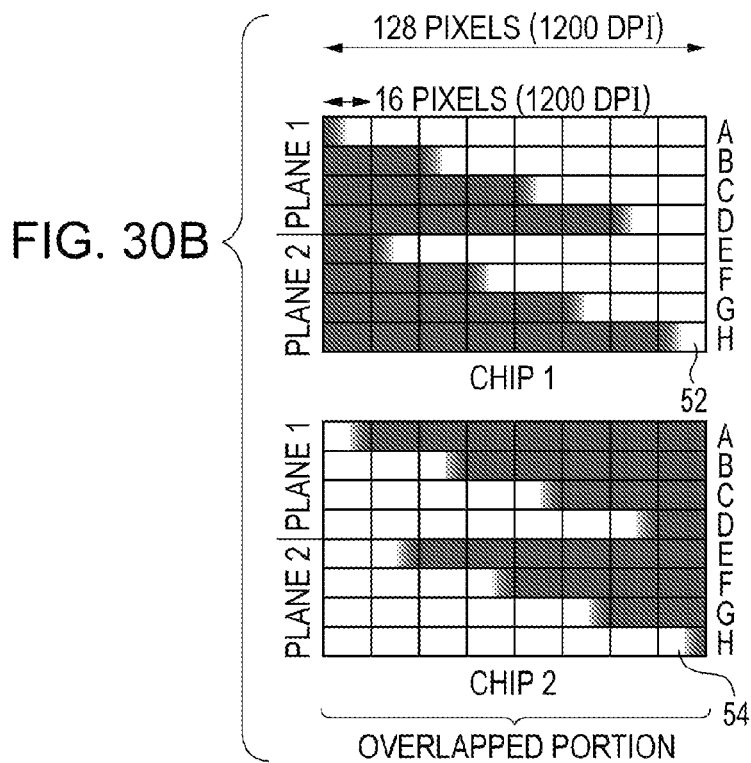

As an example of mask application to the overlapped portion, FIG. 30A shows a mask application example 1 and FIG. 30B shows a mask application example 2. In FIGS. 30A and 30B, the right end of the figure corresponds to the chip end of the first chip and the nearer the left end, the nearer the center of the chip. In FIGS. 30A and 30B, the left end of the figure corresponds to the chip end of the second chip and the nearer the right end, the nearer the center of the chip.

First, the mask application example 1 in FIG. 30A will be described. First, 128 pixels in 1200 dpi are divided by the number of nozzle arrays 8, and 16 pixels per array are obtained. Therefore, in the mask application example 1, 16 pixels in a nozzle array in the nozzle arrangement direction are defined as one segment, and whether or not the mask is applied to each segment is determined individually for each nozzle array. In each nozzle array, the gradation mask is applied to any of only one segment in the nozzle arrangement direction. A mask of "ON" is applied to all bits closer to the center of the chip than the segment to which the gradation mask is applied. On the other hand, a mask of "OFF" is applied to all bits closer to the end of the chip than the segment to which the gradation mask is applied. By shifting the segment to which the gradation mask is applied in all the arrays, the recording duty of the entire chip has a gradation. In FIG. 30A, an area in which all bits are masked by "OFF" is indicated by a white area, an area in which all bits are masked by "ON" is indicated by a black area, and an area to which the gradation mask is applied is indicated by a transfer from black to white.

In this mask application example 1, the overlapped dots can be created between the planes even when the shape of the gradation masks of the segments to which the gradation mask is applied are different from each other in all the arrays in the same chip, the shapes are different from each other in at least a part of the arrays, or the shapes are the same in all the arrays. This is because, when comparing the mask patterns of all the arrays in a certain segment, a different mask is applied to at least one array in each of the two planes.

In this way, the feature of the mask application example 1 is that, in the center portion of the overlapped portion, both the recording duty of the plane 2 of the first chip and the recording duty of the plane 1 of the second chip become the maximum. Based on this, the amount of the overlapped dots in the first chip and the second chip can be increased in the center portion, so that the same effect as that of the first embodiment can be obtained.

Next, the mask application example 2 will be described with reference to FIG. 30B. While the mask application example 2 uses the same gradation mask as that of the mask application example 1, the mask application example 2 changes the position of the segment to which the gradation mask is applied. The feature of the mask application example 2 is that, when comparing with the mask application example 1, the rate of the overlapped dots in a chip is high in the center portion of the connection portion of the chips, so that the rate of the overlapped dots between the chips is suppressed relatively low.

As described above, according to the mask application examples 1 and 2, by changing the segment to which the gradation mask is applied, it is possible to appropriately adjust the rate of the overlapped dots between the chips in the center portion of the connection portion of the chips. Therefore, when the registration misalignment occurs between the chips, the stripe in the connection portion can be reduced.

Although, in this embodiment, an idea for dividing a nozzle array into segments is introduced and described, it is also possible to adjust the number of overlapped dots between the chips by properly adjusting the gradient of the gradation for each nozzle array individually as in a conventional manner. Only the rate of the overlapped dots between the chips has to be adjusted, so that the method is not limited to the masks.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-144213 filed Jun. 24, 2010, which is hereby incorporated by reference herein in its entirety.

What is claimed is:

1. An image processing apparatus in order to print an image on a printing medium by a relative movement of the printing medium and a print head in which a first chip and a second chip each of which includes first and second nozzle arrays for ejecting ink are arranged in a predetermined direction crossing a nozzle arrangement direction in a nozzle array, wherein the first chip and the second chip are shifted from each other in the nozzle arrangement direction so that each of (i) nozzles of the first nozzle array in an overlapped portion of the first chip, (ii) nozzles of the first nozzle array in the overlapped portion of the second chip, (iii) nozzles of the second nozzle array in the overlapped portion of the first chip and (iv) nozzles of the second nozzle array in the overlapped portion of the second chip performs printing on a same region on the printing medium, the image processing apparatus comprising:

an obtaining unit configured to obtain first image data corresponding to the overlapped portion of the first nozzle array of both of the first chip and the second chip, and second image data corresponding to the overlapped portion of the second nozzle arrays of both of the first chip and the second chip; and a distribution unit configured to distribute the first image data to the first chip and the second chip by using a first mask pattern corresponding to the first chip and a second mask pattern corresponding to the second chip respectively, and distribute the second image data to the first chip and the second chip by using a third mask pattern corresponding to the first chip and a fourth mask pattern corresponding to the second chip respectively, wherein in each of the first, second, third and fourth mask patterns, print permitting pixels and non-print permitting pixels for the same region are arranged, wherein a plurality of print permitting pixels are arranged such that
(i) a print permitting ratio in each of the first mask pattern and the third mask pattern corresponding to the nozzle at a first position in the nozzle arrangement direction is lower than a print permitting ratio in each of the first mask pattern and the third mask pattern corresponding to the nozzle at a second position which is more distant than the first position from an end position of the nozzle array of the first chip in the nozzle arrangement direction respectively, and
(ii) the print permitting ratio in the first mask pattern corresponding to nozzles at the first position in the nozzle arrangement direction is lower than the print permitting ratio in the third mask pattern corresponding to nozzles at the first position in the nozzle arrangement direction.

2. The image processing apparatus according to claim 1, wherein the print permitting pixels in the first mask pattern and the print permitting pixels in the second mask pattern are in an exclusive relationship.

3. The image processing apparatus according to claim 1, wherein an arrangement of the print permitting pixels in the first mask pattern and an arrangement of the print permitting pixels in the third mask pattern are different from each other.

4. The image processing apparatus according to claim 1, wherein the print permitting pixels in the first mask pattern and the print permitting pixels in the second mask pattern are a complimenting relationship to each other.

5. The image processing apparatus according to claim 1, wherein the nozzles of the print head permits printing to each of the pixels a plurality of times, and wherein a value of the first image data is same as a value of the second image data in each of the pixels.

6. The image processing apparatus according to claim 1, wherein the plurality of print permitting pixels are arranged such that
(i) a print permitting ratio in each of the second mask pattern and the fourth mask pattern corresponding to the nozzle at a third position in the nozzle arrangement direction is lower than a print permitting ratio in each of the second mask pattern and the fourth mask pattern corresponding to the nozzle at a fourth position which is more distant than the third position from an end position of the nozzle array of the second chip in the nozzle arrangement direction respectively, and
(ii) the print permitting ratio in the fourth mask pattern corresponding to nozzles at the third position in the nozzle arrangement direction is lower than the print permitting ratio in the second mask pattern corresponding to nozzles at the third position in the nozzle arrangement direction.

7. The image processing apparatus according to claim 1, wherein the nozzle of the second nozzle array in the second chip is permitted printing on at least one pixel among pixels permitted printing by the nozzle of the first nozzle array in the first chip.

8. The image processing apparatus according to claim 1, wherein each of (i) nozzles of the first nozzle array of the first chip, (ii) nozzles of the first nozzle array of the second chip, (iii) nozzles of the second nozzle array of the first chip, and (iv) nozzles of the second nozzle array of the second chip are used for ejecting same color ink.

9. The image processing apparatus according to claim 1, further comprising
a dividing unit configured to divide multi-valued image data, having N-gray-level, corresponding to the image into first multi-valued image data having N-gray-level corresponding to nozzles of the first nozzle arrays in the overlapped portion of the first chip and the second chip and second multi-valued image data having N-gray-level corresponding to nozzles of the second nozzle arrays in the overlapped portion of the first chip and the second chip,
a first quantizing unit configured to generate first quantized data having K-gray level, wherein K is smaller than N, and second quantized data having the K-gray-level by quantizing each of the first multi-valued image data and the second multi-valued image data respectively, and
a second quantizing unit configured to generate the first image data having L-gray-level, wherein L is smaller than K, and the second image data having the L-gray-level by quantizing each of the first quantized data and the second quantized data respectively,
wherein the obtaining unit obtains the first image data and the second image data generated by the second quantizing unit.

10. The image processing apparatus according to claim 9, wherein
the first quantizing unit quantizes the first multi-valued image data and the second multi-valued image data by performing an error diffusion process by using an error distribution coefficient which determines a distributing ratio, wherein the error diffusion process is a process for distributing errors generated by quantizing an objective pixel to surrounding pixels based on the distributing ratio.

11. The image processing apparatus according to claim 10, wherein
the first quantizing unit quantizes the first multi-valued image data by performing the error diffusion process by using a first error distribution coefficient and quantizes the second multi-valued image data by performing the error diffusion process by using a second error distribution coefficient which is different from the first error distribution coefficient.

12. The image processing apparatus according to claim 9, wherein
the second quantizing unit quantizes the first quantized data and the second quantized data by performing an index expansion process by using an index expansion table which determines a number of printing dots and a position of printing dots with respect to each of values of the first quantized data and the second quantized data.

13. The image processing apparatus according to claim 12, wherein
the second quantizing unit quantizes the first quantized data by performing the index expansion process by using a first index expansion table and quantizes the second quantized data by performing the index expansion process by using a second index expansion table which is different from the first index expansion table.

14. The image processing apparatus according to claim 1, further comprising the print head configured to eject ink based on the first image data distributed to the first chip and the second chip and the second image data distributed to the first chip and the second chip.

* * * * *